(12) United States Patent
Kim et al.

(10) Patent No.: US 12,493,217 B2
(45) Date of Patent: Dec. 9, 2025

(54) DISPLAY DEVICE AND LIGHT SOURCE DEVICE THEREFOR

(71) Applicant: SAMSUNG ELECTRONICS CO., LTD., Suwon-si (KR)

(72) Inventors: Hyungsuk Kim, Suwon-si (KR); Sungyeol Kim, Suwon-si (KR); Chunsoon Park, Suwon-si (KR); Taeyeon Kim, Suwon-si (KR); Junsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/892,636

(22) Filed: Sep. 23, 2024

(65) Prior Publication Data
US 2025/0013101 A1 Jan. 9, 2025

Related U.S. Application Data

(63) Continuation of application No. PCT/KR2023/004986, filed on Apr. 13, 2023.

(30) Foreign Application Priority Data

May 24, 2022 (KR) .......... 10-2022-0063702

(51) Int. Cl.
G02F 1/1335 (2006.01)
G02F 1/13357 (2006.01)

(52) U.S. Cl.
CPC .. *G02F 1/133612* (2021.01); *G02F 1/133603* (2013.01); *G02F 1/133605* (2013.01)

(58) Field of Classification Search
CPC ......... G02F 1/133612; G02F 1/133603; G02F 1/133605; G02F 1/1335; G02F 1/1336; G02F 1/133606
See application file for complete search history.

(56) References Cited

U.S. PATENT DOCUMENTS 6,319,543 B1    11/2001  Soutar et al.
6,861,677 B2 *   3/2005  Chen ............... H01L 25/167
                                               257/E25.032

(Continued)

FOREIGN PATENT DOCUMENTS

CN    2044073556 U    6/2015
JP       6846866 B2    3/2011

(Continued)

OTHER PUBLICATIONS

English translation of Hyuk KR-20220054107-A (Year: 2022).*

(Continued)

*Primary Examiner* — Evan P Dzierzynski
(74) *Attorney, Agent, or Firm* — Sughrue Mion, PLLC

(57) ABSTRACT

A light source device includes: a reflective sheet including a hole formed therein; and a light source module including a portion inserted into the hole, a substrate including a first layer including a feeding line, and a second layer laminated in an upper portion of the first layer, a light-emitting diode on the second layer, a feeding pad, connected to the feeding line, in a window formed in the second layer and configured to contact the light-emitting diode, an insulating dome on the second layer, and an antistatic pad on the second layer and including a silver plating layer, a first antistatic pad within a region defined by the hole, and a second antistatic pad outside of the region defined by the hole and extending in the longitudinal direction of the feeding line spaced a first length therefrom in the width direction of the feeding line.

15 Claims, 24 Drawing Sheets

(56) References Cited

U.S. PATENT DOCUMENTS

| | | | |
|---|---|---|---|
| 9,520,386 B2 | 12/2016 | Song et al. | |
| 9,891,471 B2 | 2/2018 | Kim et al. | |
| 2008/0012125 A1 | 1/2008 | Son | |
| 2012/0061698 A1 | 3/2012 | Toscano et al. | |
| 2015/0221680 A1* | 8/2015 | Nakata | H10D 86/0212 |
| | | | 349/40 |
| 2017/0123271 A1* | 5/2017 | Kim | G02B 19/0061 |
| 2017/0179345 A1* | 6/2017 | Yamada | H10H 20/855 |
| 2020/0279838 A1 | 9/2020 | Chen et al. | |
| 2021/0180755 A1* | 6/2021 | Park | H10H 20/855 |
| 2023/0103123 A1 | 3/2023 | Lee et al. | |
| 2023/0314875 A1 | 10/2023 | Jang et al. | |

FOREIGN PATENT DOCUMENTS

| | | | |
|---|---|---|---|
| JP | 2012-009794 A | | 1/2012 |
| JP | 2014-192310 A | | 10/2014 |
| JP | 2015-88541 A | | 5/2015 |
| JP | 2015-103615 A | | 6/2015 |
| KR | 10-0442405 B1 | | 12/2004 |
| KR | 10-0610275 B1 | | 8/2006 |
| KR | 10-2008-0006857 A | | 1/2008 |
| KR | 10-2011-0120163 A | | 11/2011 |
| KR | 10-1103296 B1 | | 1/2012 |
| KR | 10-2013-0055203 A | | 5/2013 |
| KR | 10-2014-0099503 A | | 8/2014 |
| KR | 10-2016-0001856 A | | 1/2016 |
| KR | 10-2017-0050993 A | | 5/2017 |
| KR | 10-2188993 B1 | | 12/2020 |
| KR | 10-2021-0157794 A | | 12/2021 |
| KR | 10-2022-0054107 A | | 5/2022 |
| KR | 20220054107 A | * | 5/2022 |

OTHER PUBLICATIONS

International Search Report (PCT/ISA/210) issued on Jul. 26, 2023 by the International Searching Authority in International Patent Application No. PCT/KR2023/004986.

Written Opinion (PCT/ISA/237) issued on Jul. 26, 2023 by the International Searching Authority in International Patent Application No. PCT/KR2023/004986.

* cited by examiner (a)

(b)

DISPLAY DEVICE AND LIGHT SOURCE DEVICE THEREFOR

CROSS-REFERENCE TO RELATED APPLICATIONS

This application is a continuation of International Application No. PCT/KR2023/004986, filed on Apr. 13, 2023, which is based on and claims priority to Korean Patent Application No. 10-2022-0063702, filed on May 24, 2022, in the Korean Intellectual Property Office, the disclosures of which are incorporated by reference herein in their entireties.

BACKGROUND

1. Field

The present disclosure relates to a display apparatus and a light source device thereof, and more particularly to a display apparatus that may be configured to improve luminance while preventing or suppressing damage to a light source caused by static electricity, and a light source module thereof.

2. Description of the Related Art

Generally, a display apparatuses convert electrical information into visual information and display the visual information to a user, and the display apparatus is used in various fields, such as home or workplace.

The display apparatus includes a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus includes a light source module to convert electrical information into visual information, and the light source module includes a plurality of light sources configured to independently emit light.

Each of the plurality of light sources includes a light emitting diode (LED) or an organic light emitting diode (OLED). For example, the LED or the OLED may be mounted on a circuit board or a substrate.

During the production or use or maintenance of the display apparatus, static electricity may be generated and damage the light source. In order to prevent or suppress the damage, each light source generally includes a static electricity protection circuit (e.g., Zener Diode) along with a light emitting diode.

However, when the number of light sources is increased to improve contrast ratio, the area allocated to the light emitting diode and Zener diode is reduced.

SUMMARY

Provided is a display apparatus including a plurality of light sources which may include a light emitting diode without a Zener diode.

Further provided is a display apparatus including an antistatic member that may be disposed near a plurality of light sources which may result in a suppression or prevention of damage to the light sources due to static electricity.

Further provided is a display apparatus in which a portion of an antistatic member may be exposed to one surface of a substrate is plated with silver (Ag).

According to an aspect of the disclosure, a light source device includes: a reflective sheet comprising a hole formed therein; and a light source module including a portion inserted into the hole. The light source module includes a substrate including a first layer including a feeding line, and a second layer laminated in an upper portion of the first layer; a light-emitting diode on the second layer of the substrate; a feeding pad, connected to the feeding line, and arranged in a window formed in the second layer of the substrate and configured to contact the light-emitting diode; an insulating dome on the second layer of the substrate and configured to cover the light-emitting diode; and an antistatic pad on the second layer of the substrate and including a silver plating layer. The antistatic pad includes a first antistatic pad within a region defined by the hole; and a second antistatic pad outside of the region defined by the hole and extending in a longitudinal direction of the feeding line spaced apart by a first length in a width direction of the feeding line.

A width of the second antistatic pad may be equal to a width of the feeding line.

The second antistatic pad may be covered by the reflective sheet.

The insulating dome and the hole may be provided in a plurality respectively corresponding to each other, and the second antistatic pad may be provided in a plurality on both lateral sides of the feeding line between the plurality of holes.

The first length may be greater than or equal to 0.4 mm and less than or equal to 0.6 mm.

The width of the feeding line may be equal to the first length.

The first layer may include a conductive antistatic line.

The silver plating layer of the antistatic pad may be applied to the antistatic line exposed to an outside through the window formed in the second layer.

The antistatic line may be electrically connected to a ground of the light source device or coupled to the ground by capacitance.

The second antistatic pad may extend along the longitudinal direction of the feeding line to a region at which the second antistatic pad contacts a boundary line of the region defined by the hole.

An upper surface of the feeding pad may be plated with silver (Ag).

The first antistatic pad may be spaced apart from the light-emitting diode.

At least one first antistatic pad may be provided and disposed outside of the insulating dome.

At least one first antistatic pad may be provided and a portion of the at least one first antistatic pad may overlap with the insulating dome.

The light-emitting diode may directly contact with the feeding pad without a wire or ball grid The light-emitting diode may directly contact with the feeding pad without a Zener diode connected in parallel with the light-emitting diode.

According to another aspect of the present disclosure, a display apparatus includes a light source device configured to emit surface light by including a light source module and a diffuser plate configured to diffuse light emitted from the light source module; and a liquid crystal panel configured to block or transmit the surface light. The light source module includes a substrate including a first layer including a feeding line and a second layer laminated in an upper portion of the first layer; a light-emitting diode disposed on the second layer of the substrate; a feeding pad connected to the feeding line and disposed in a window formed on the second layer so as to be in contact with the light-emitting diode; an insulating dome disposed on the second layer of the substrate to cover the light-emitting diode; a first antistatic pad formed on the second layer inside a first region formed by a virtual circle having a radius greater than a radius of the insulating dome; and a second antistatic pad formed on the second layer outside the first region and provided to extend along a longitudinal direction of the feeding line until the second antistatic pad is in contact with the first region, at a location spaced apart by a first length in a width direction of the feeding line.

The first antistatic pad and the second antistatic pad may include a silver plating layer exposed on one surface of the substrate.

The first layer may include a conductive antistatic line, and the silver plating layer may be applied to the antistatic line exposed to an outside through the window formed in the second layer.

The first length may be greater than or equal to 0.4 mm and less than or equal to 0.6 mm.

A width of the feeding line and a width of the second antistatic pad may be equal to the first length.

Damage to the light sources due to electrostatic discharge may be suppressed or prevented by including an antistatic member provided near a plurality of light sources.

Further, an overall luminance of a display apparatus and light source device may be improved by plating a portion of an upper surface of a substrate with silver (Ag).

Further, as a metal portion exposed on one surface of a substrate is provided as silver (Ag), an oxidation rate of the metal portion may be slowed down during long-term storage of the substrate, thereby improving storage reliability.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
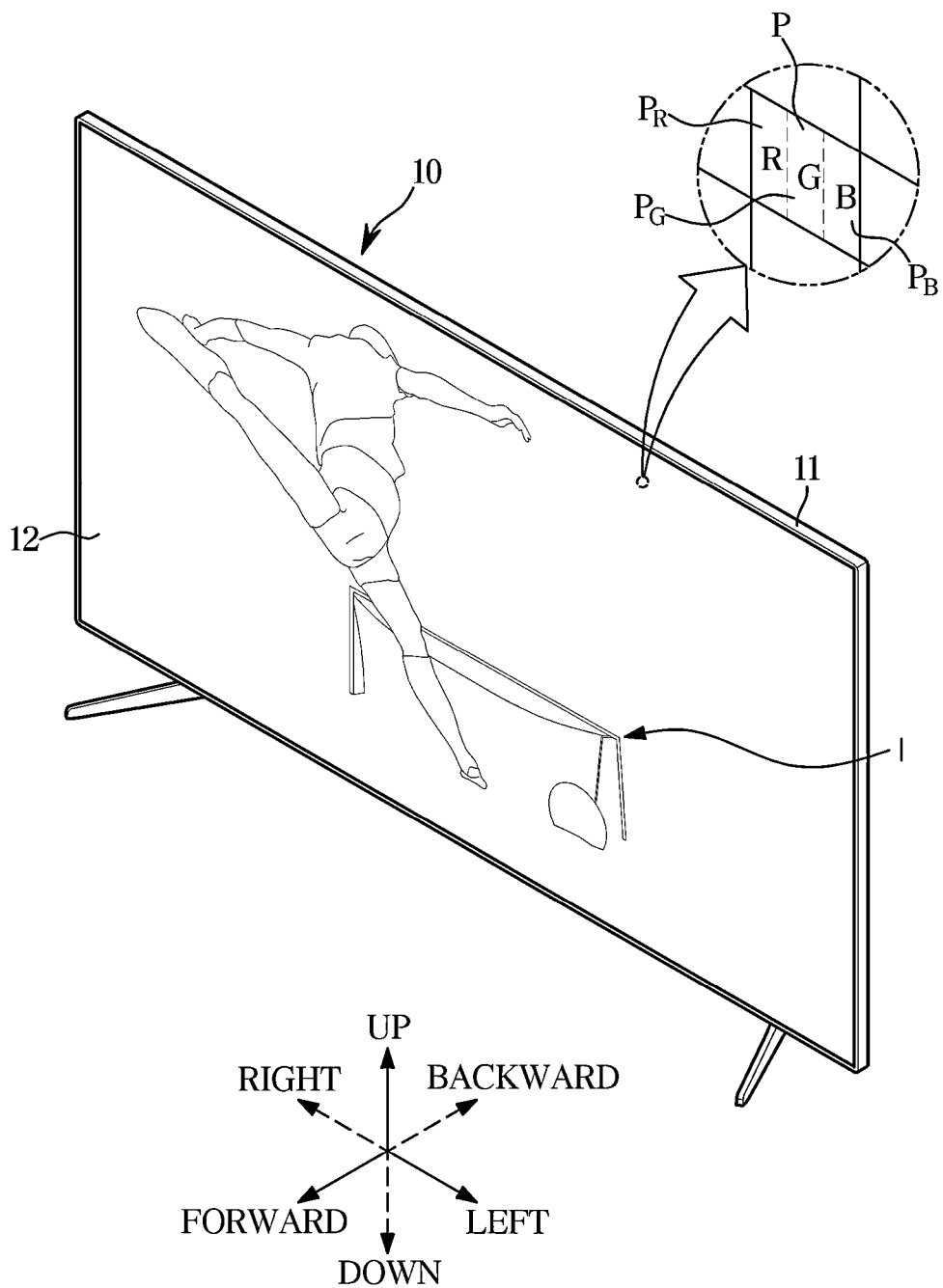
FIG. 1 illustrates an appearance of a display apparatus according to some embodiments.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Hereinafter exemplary embodiments of the present disclosure will be described in detail with reference to the accompanying drawings.

Figure 2:
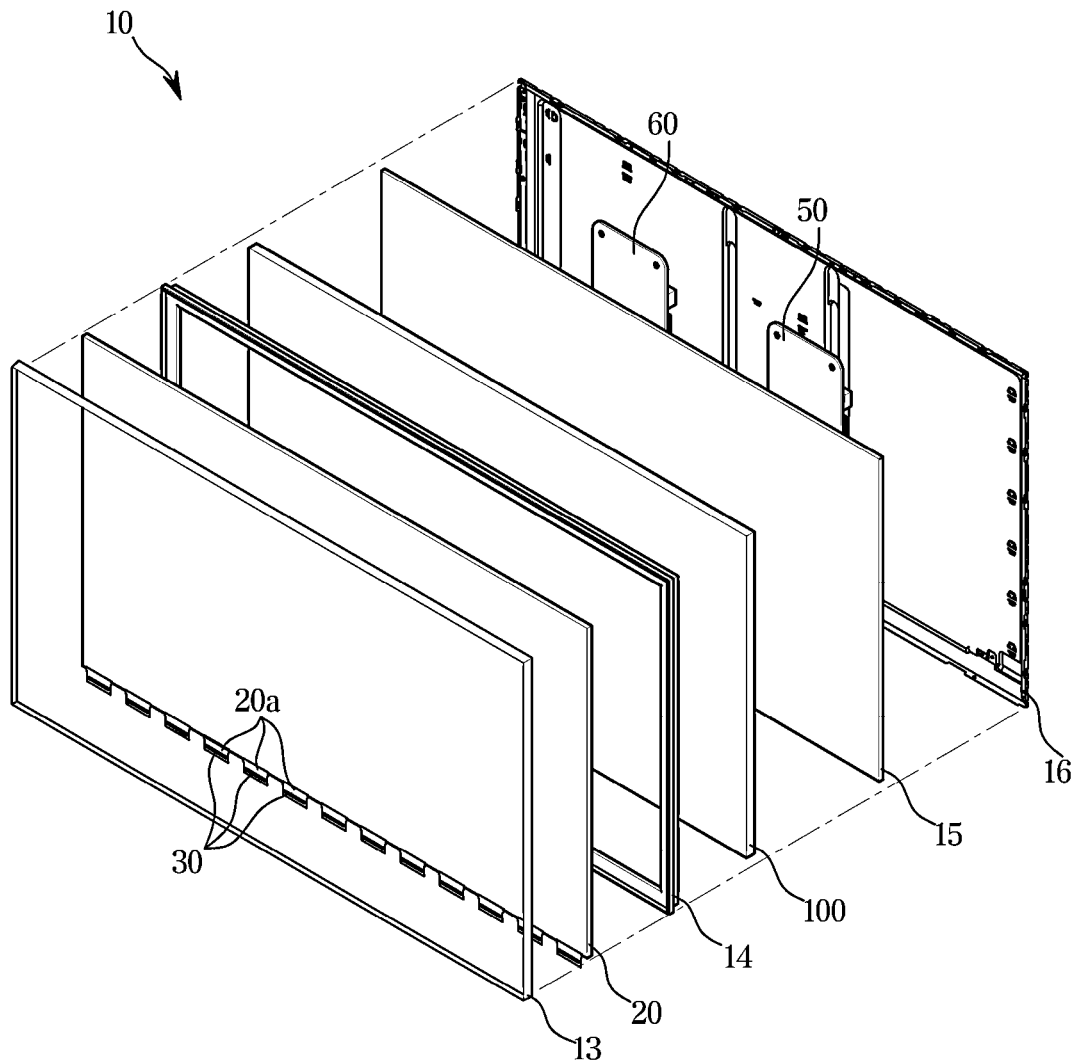
FIG. 2 illustrates an exploded view of the display apparatus shown in FIG. 1.
Figure 2:
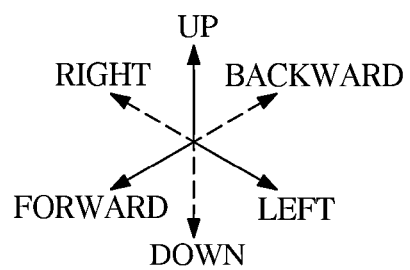
Figure 3:
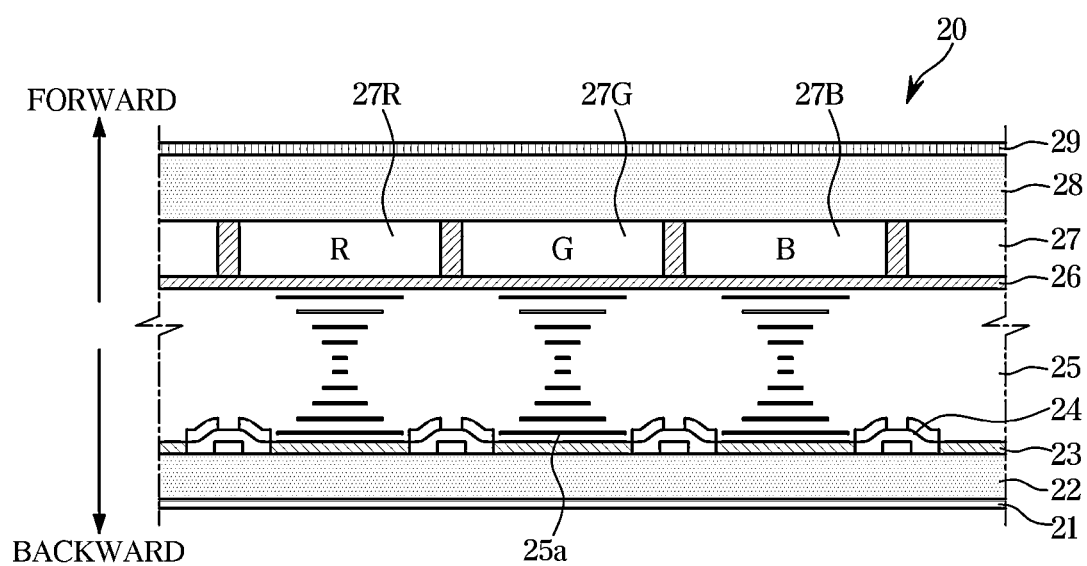
FIG. 3 illustrates a side sectional view of a liquid crystal panel of the display apparatus according to some embodiments.

FIG. 1 illustrates an appearance of a display apparatus according to some embodiments. FIG. 2 illustrates an exploded view of the display apparatus shown in FIG. 1. FIG. 3 illustrates a side sectional view of a liquid crystal panel of the display apparatus according to some embodiments.

Referring to FIG. 1, a display apparatus 10 is a device that processes an image signal received from an outside and visually displays the processed image. Hereinafter a case in which the display apparatus 10 is a television is exemplified, but the disclosure is not limited thereto. For example, the display apparatus 10 may be implemented in various forms, such as a monitor, a portable multimedia device, and a portable communication device, and the display apparatus 10 is not limited in its shape as long as visually displaying an image.

The display apparatus 10 may be a large format display (LFD) installed outdoors, such as a roof of a building or a bus stop. The outdoor is not limited to the outside of a building, and thus the display apparatus 10 according to some embodiments may be installed in any places as long as the display apparatus is accessed by a large number of people, even indoors, such as subway stations, shopping malls, movie theaters, companies, and stores.

The display apparatus 10 may receive content data including video data and audio data from various content sources and output video and audio corresponding to the video data and the audio data. For example, the display apparatus 10 may receive content data through a broadcast reception antenna or cable, receive content data from a content playback device, or receive content data from a content providing server of a content provider.

As illustrated in FIG. 1, the display apparatus 10 includes a main body 11, a screen 12 provided to display an image I, and a supporter 19 disposed below the main body 11 to support the main body 11.

The main body 11 may form an appearance of the display apparatus 10, and the main body 11 may include a component configured to allow the display apparatus 10 to display the image I and to perform various functions. Although the main body 11 shown in FIG. 1 is in the form of a flat plate, the shape of the main body 11 is not limited thereto. For example, the main body 11 may have a curved plate shape.

The screen 12 may be formed on a front surface of the main body 11, and display the image I. For example, the screen 12 may display a still image or a moving image. Further, the screen 12 may display a two-dimensional plane image or a three-dimensional image using binocular parallax of the user.

A plurality of pixels P may be formed on the screen 12 and the image I displayed on the screen 12 may be formed by a combination of the lights emitted from the plurality of pixels P. For example, the image I may be formed on the screen 12 by combining light emitted from the plurality of pixels P as a mosaic.

Each of the plurality of pixels P may emit different brightness and different color of light. In order to emit different brightness of light, each of the plurality of pixels P may include a self-luminous panel (for example, a light emitting diode panel) configured to directly emit light or a non-self-luminous panel (for example, a liquid crystal panel) configured to transmit or block light emitted by a light source device.

In order to emit light in the various colors, the plurality of pixels P may include sub-pixels PR, PG, and PB, respectively.

The sub-pixels PR, PG, and PB may include a red sub pixel PR emitting red light, a green sub pixel PG emitting green light, and a blue sub pixel PB emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel PR, the green light of the green sub pixel PG and the blue light of the blue sub pixel PB, each of the plurality of pixels P may emit different brightness and different color of light.

As illustrated in FIG. 2, various components configured to generate the image I on the screen S may be provided inside the main body 11.

For example, the main body 11 may include a light source device 100 that is a surface light source, a liquid crystal panel 20 configured to block or transmit light emitted from the light source device 100, a control assembly 50 configured to control an operation of the light source device 100 and the liquid crystal panel 20, and a power assembly 60 configured to supply power to the light source device 100 and the liquid crystal panel 20. Further, the main body 11 may include a bezel 13, a frame middle mold 14, a bottom chassis 15 and a rear cover 16 which are provided to support and fix the liquid crystal panel 20, the light source device 100, the control assembly 50, and the power assembly 60.

The light source device 100 may include a point light source configured to emit monochromatic light or white light. The light source device 100 may refract, reflect, and scatter light in order to convert light, which is emitted from the point light source, into uniform surface light. For example, the light source device 100 may include a plurality of light sources configured to emit monochromatic light or white light, a diffuser plate configured to diffuse light incident from the plurality of light sources, a reflective sheet configured to reflect light emitted from the plurality of light sources and a rear surface of the diffuser plate, and an optical sheet configured to refract and scatter light emitted from a front surface of the diffuser plate.

As mentioned above, the light source device 100 may refract, reflect, and scatter light emitted from the light source, thereby emitting uniform surface light toward the front side.

A configuration of the light source device 100 will be described below.

The liquid crystal panel 20 may be provided in front of the light source device 100 and block or transmit light emitted from the light source device 100 to form the image I.

A front surface of the liquid crystal panel 20 may form the screen S of the display apparatus 10 described above, and the liquid crystal panel 20 may form the plurality of pixels P. In the liquid crystal panel 20, the plurality of pixels P may independently block or transmit light from the light source device 100, and the light transmitted through the plurality of pixels P may form the image I displayed on the screen S.

For example, as illustrated in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 may be provided on the outside of the first and second transparent substrates 22 and 28.

Each of the first polarizing film 21 and the second polarizing film 29 may transmit a specific light beam and block other light beams. For example, the first polarizing film 21 may transmit a light beam having a magnetic field vibrating in a first direction and block other light beams. In addition, the second polarizing film 29 may transmit a light beam having a magnetic field vibrating in a second direction and block other light beams. In this case, the first direction and the second direction may be perpendicular to each other. Accordingly, a polarization direction of the light transmitted through the first polarizing film 21 and a vibration direction of the light transmitted through the second polarizing film 29 may be perpendicular to each other. As a result, in general, light may not pass through the first polarizing film 21 and the second polarizing film 29 at the same time.

The color filter 27 may be provided on an inner side of the second transparent substrate 28.

The color filter 27 may include a red filter 27R transmitting red light, a green filter 27G transmitting green light, and a blue filter 27B transmitting blue light. The red filter 27R, the green filter 27G, and the blue filter 27B may be disposed parallel to each other. A region, in which the color filter 27 is formed, may correspond to the pixel P described above. A region, in which the red filter 27R is formed, may correspond to the red sub-pixel PR, a region, in which the green filter 27G is formed, may correspond to the green sub-pixel PG, and a region, in which the blue filter 27B is formed, may correspond to the blue sub-pixel PB.

The pixel electrode 23 may be provided on an inner side of the first transparent substrate 22, and the common electrode 26 may be provided on an inner side of the second transparent substrate 28.

The pixel electrode 23 and the common electrode 26 may be formed of a metal material through which electricity is conducted, and the pixel electrode 23 and the common electrode 26 may generate an electric field to change the arrangement of liquid crystal molecules 25a forming the liquid crystal layer 25 to be described below.

The pixel electrode 23 and the common electrode 26 may be formed of a transparent material, and may transmit light incident from the outside. For example, the pixel electrode 23 and the common electrode 26 may include indium tin oxide (ITO), indium zinc oxide (IZO), silver nanowire (Ag nano wire), carbon nanotube (CNT), graphene, or poly (3,4-ethylenedioxythiophene) (PEDOT).

The thin film transistor (TFT) 24 may be provided on an inner side of the second transparent substrate 22.

The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The TFT 24 may be formed of poly-silicon, and may be formed by semiconductor processes, such as lithography, deposition, and ion implantation.

The liquid crystal layer 25 may be formed between the pixel electrode 23 and the common electrode 26, and the liquid crystal layer 25 may be filled with the liquid crystal molecules 25a.

Liquid crystals represent an intermediate state between a solid (crystal) and a liquid. Most of the liquid crystal materials are organic compounds, and the molecular shape is in the shape of an elongated rod, and the orientation of molecules is in an irregular state in one direction, but in a regular state in other directions. As a result, the liquid crystal has both the fluidity of the liquid and the optical anisotropy of the crystal (solid).

In addition, liquid crystals also exhibit optical properties according to a change in an electric field. For example, in the liquid crystal, the orientation of molecules forming the liquid crystal may change according to a change in an electric field. In response to an electric field being generated in the liquid crystal layer 25, the liquid crystal molecules 25a of the liquid crystal layer 25 may be disposed along the direction of the electric field. In response to the electric field not being generated in the liquid crystal layer 25, the liquid crystal molecules 25a may be disposed irregularly or disposed along an alignment layer (not shown). As a result, the optical properties of the liquid crystal layer 25 may vary depending on the presence or absence of the electric field passing through the liquid crystal layer 25.

A cable 20a configured to transmit image data to the liquid crystal panel 20, and a display driver integrated circuit (DDI) (hereinafter referred to as 'driver IC') 30 configured to process digital image data and output an analog image signal may be provided at one side of the liquid crystal panel 20.

The cable 20a may electrically connect the control assembly 50/the power assembly 60 to the driver IC 30, and may also electrically connect the driver IC 30 to the liquid crystal panel 20. The cable 20a may include a flexible flat cable or a film cable that is bendable.

The driver IC 30 may receive image data and power from the control assembly 50/the power assembly 60 through the cable 20a. The driver IC 30 may transmit the image data and driving current to the liquid crystal panel 20 through the cable 20a.

In addition, the cable 20a and the driver IC 30 may be integrally implemented as a film cable, a chip on film (COF), or a tape carrier package (TCP). In other words, the driver IC 30 may be arranged on the cable 110b. However, the disclosure is not limited thereto, and the driver IC 30 may be arranged on the liquid crystal panel 20.

The control assembly 50 may include a control circuit configured to control an operation of the liquid crystal panel 20 and the light source device 100. The control circuit may process image data received from an external content source, transmit the image data to the liquid crystal panel 20, and transmit dimming data to the light source device 100.

The power assembly 60 may supply power to the liquid crystal panel 20 and the light source device 100 to allow the light source device 100 to output surface light and to allow the liquid crystal panel 20 to block or transmit the light of the light source device 100.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Hereinafter the light source device 100 will be described.

Figure 4:
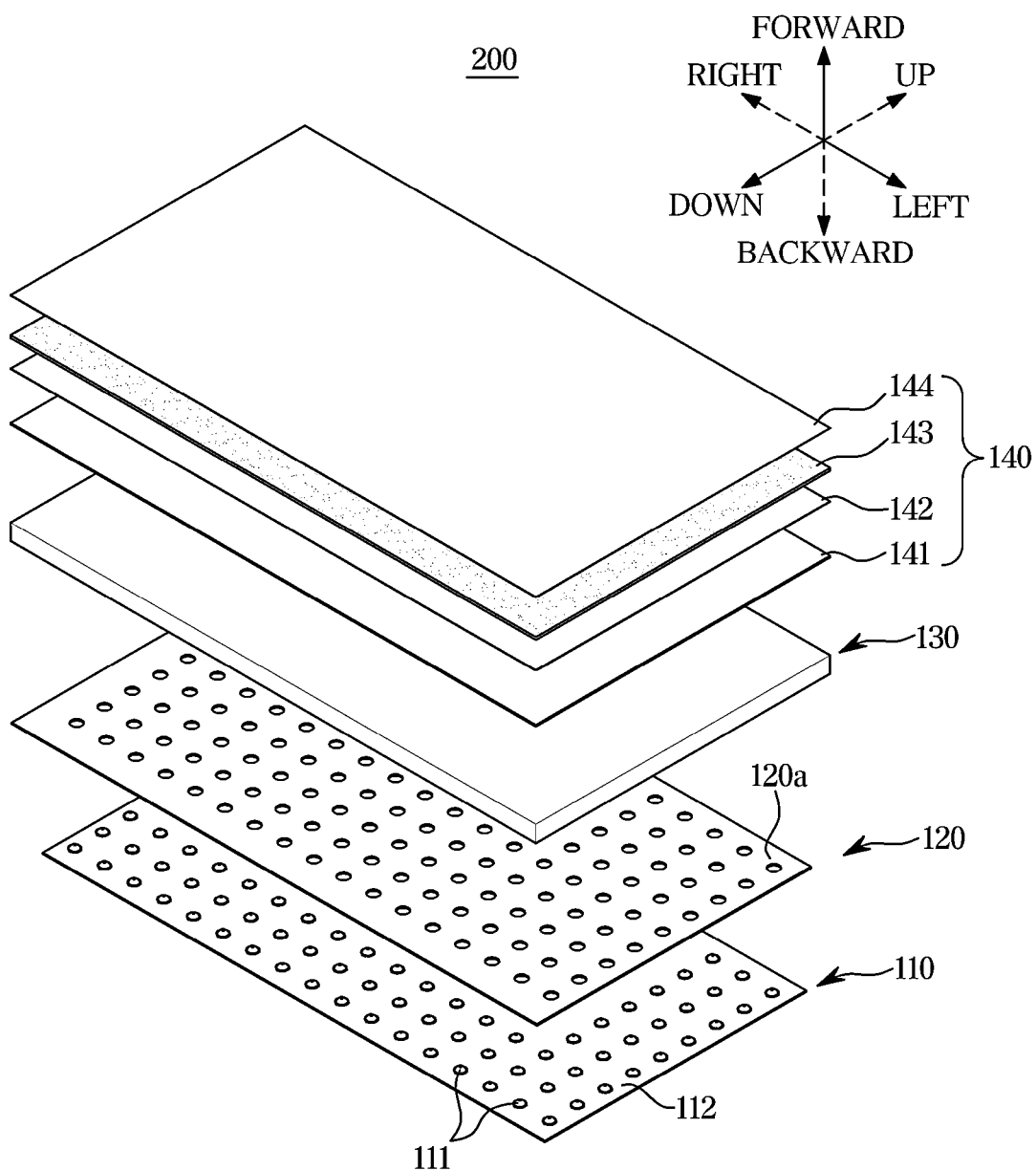
FIG. 4 illustrates an exploded view of a light source device according to some embodiments.
Figure 5:
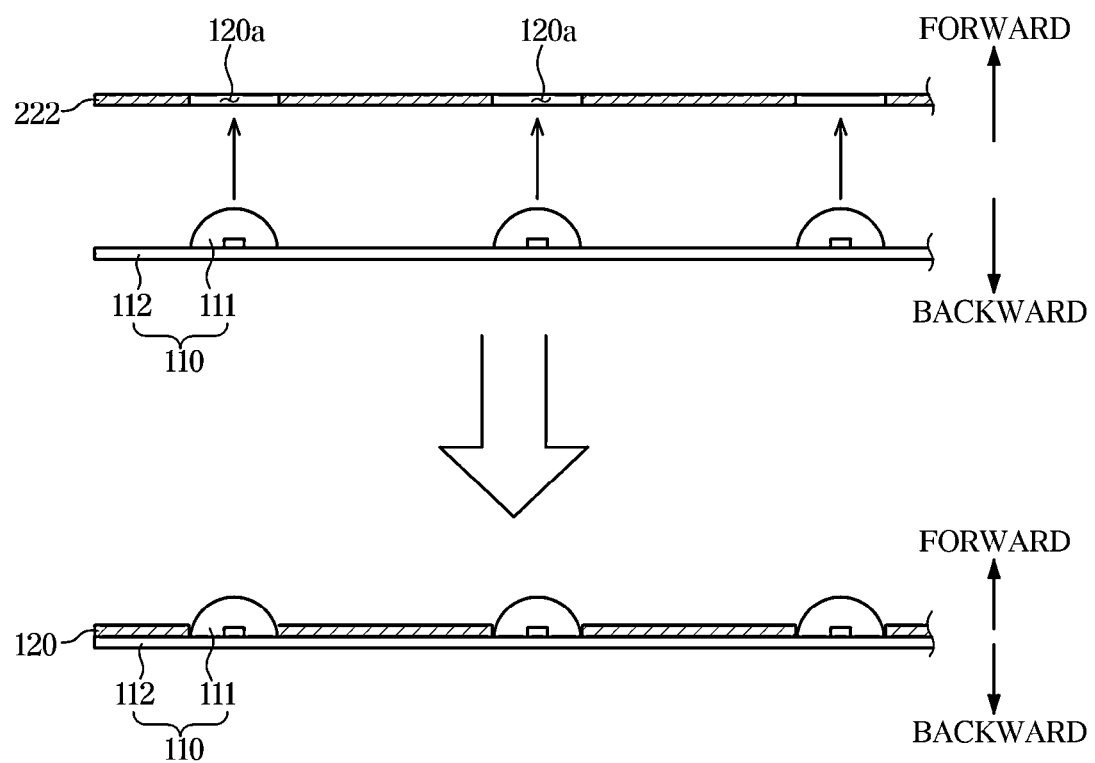
FIG. 5 illustrates coupling between a light source module and a reflective sheet included in the light source device according to some embodiments.

FIG. 4 illustrates an exploded view of a light source device according to some embodiments. FIG. 5 illustrates coupling between a light source module and a reflective sheet included in the light source device according to some embodiments.

The light source device 100 may include a light source module 110 configured to generate light, a reflective sheet 120 configured to reflect light, a diffuser plate 130 configured to uniformly diffuse light, and an optical sheet 140 configured to improve a luminance of light that is emitted.

The light source module 110 may include a plurality of light sources 111 configured to emit light, and a substrate 112 provided to support/fix the plurality of light sources 111.

The plurality of light sources 111 may be disposed in a predetermined pattern to emit light with the uniform luminance. The plurality of light sources 111 may be disposed in such a way that a distance between one light source and light sources adjacent thereto is the same.

For example, as illustrated in FIG. 4, the plurality of light sources 111 may be disposed in rows and columns. Accordingly, the plurality of light sources may be disposed such that an approximately square is formed by four adjacent light sources. In addition, any one light source may be disposed adjacent to four light sources, and a distance between one light source and four adjacent light sources may be approximately the same.

Alternatively, the plurality of light sources may be disposed in a plurality of rows, and a light source belonging to each row may be disposed at the center of two light sources belonging to an adjacent row. Accordingly, the plurality of light sources may be disposed such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the pattern described above, and the plurality of light sources 111 may be disposed in various patterns to emit light with the uniform luminance.

The light source 111 may employ an element configured to emit monochromatic light (light of a specific wavelength, for example, blue light) or white light (for example, light of a mixture of red light, green light, and blue light) in various directions by receiving power. For example, the light source 111 may include a light emitting diode (LED).

The substrate 112 may fix the plurality of light sources 111 to prevent a change in the position of the light source 111. Further, the substrate 112 may supply power, which is for the light source 111 to emit light, to the light source 111.

The substrate 112 may fix the plurality of light sources 111 and may be configured with synthetic resin or tempered glass or a printed circuit board (PCB) on which a conductive power supply line for supplying power to the light source 111 is formed.

The reflective sheet 120 may reflect light emitted from the plurality of light sources 111 to the front side or in a direction close to the front side.

In the reflective sheet 120, a plurality of through-holes 120a is formed at positions corresponding to each of the plurality of light sources 111 of the light source module 110. In addition, the light source 111 of the light source module 110 may pass through the through-hole 120a and protrude to the front of the reflective sheet 120.

For example, as illustrated in the upper portion of FIG. 5, in the process of assembling the reflective sheet 120 and the light source module 110, the plurality of light sources 111 of the light source module 110 is inserted into the through-holes 120a formed on the reflective sheet 120. Accordingly, as illustrated in the lower portion of FIG. 5, the substrate 112 of the light source module 110 may be disposed behind the reflective sheet 120, but the plurality of light sources 111 of the light source module 110 may be disposed in front of the reflective sheet 120.

Accordingly, the plurality of light sources 111 may emit light in front of the reflective sheet 120.

The plurality of light sources 111 may emit light in various directions in front of the reflective sheet 120. The light may be emitted not only toward the diffuser plate 130 from the light source 111, but also toward the reflective sheet 120 from the light source 111. The reflective sheet 120 may reflect light, which is emitted toward the reflective sheet 120, toward the diffuser plate 130.

Light emitted from the light source 111 may pass through various objects, such as the diffuser plate 130 and the optical sheet 140. Among incident light beams passing through the diffuser plate 130 and the optical sheet 140, some of the incident light beams may be reflected from the surfaces of the diffuser plate 130 and the optical sheet 140. The reflective sheet 120 may reflect light reflected by the diffuser plate 130 and the optical sheet 140.

The diffuser plate 130 may be provided in front of the light source module 110 and the reflective sheet 120, and may evenly distribute the light emitted from the light source 111 of the light source module 110.

As described above, the plurality of light sources 111 may be disposed in various places on the rear surface of the light source device 100. Although the plurality of light sources 111 is disposed at equal intervals on the rear surface of the light source device 100, unevenness in luminance may occur depending on the positions of the plurality of light sources 111.

Within the diffuser plate 130, the diffuser plate 130 may diffuse light emitted from the plurality of light sources 111 to remove unevenness in luminance caused by the plurality of light sources 111. In other words, the diffuser plate 130 may uniformly emit uneven light of the plurality of light sources 111 to the front surface.

The optical sheet 140 may include various sheets for improving luminance and luminance uniformity. For example, the optical sheet 140 may include a diffusion sheet 141, a first prism sheet 142, a second prism sheet 143, and a reflective polarizing sheet 144.

The diffusion sheet 141 may diffuse light for the luminance uniformity. The light emitted from the light source 111 may be diffused by the diffuser plate 130 and may be diffused again by the diffusion sheet 141 included in the optical sheet 140.

The first and second prism sheets 142 and 143 may increase the luminance by condensing light diffused by the diffusion sheet 141. The first and second prism sheets 142 and 143 may include a prism pattern in the shape of a triangular prism, and the prism pattern, which is provided in plurality, may be disposed adjacent to each other to form a plurality of strips.

The reflective polarizing sheet 144 is a type of polarizing film and may transmit some of the incident light beams and reflect others for improving the luminance. For example, the reflective polarizing sheet 144 may transmit polarized light in the same direction as a predetermined polarization direction of the reflective polarizing sheet 144, and may reflect polarized light in a direction different from the polarization direction of the reflective polarizing sheet 144. In addition, the light reflected by the reflective polarizing sheet 144 is recycled inside the light source device 100, and thus the luminance of the display apparatus 10 may be improved by the light recycling.

The optical sheet 140 is not limited to the sheet or film shown in FIG. 4, and may further include various sheets or films such as a protection sheet.

Figure 6:
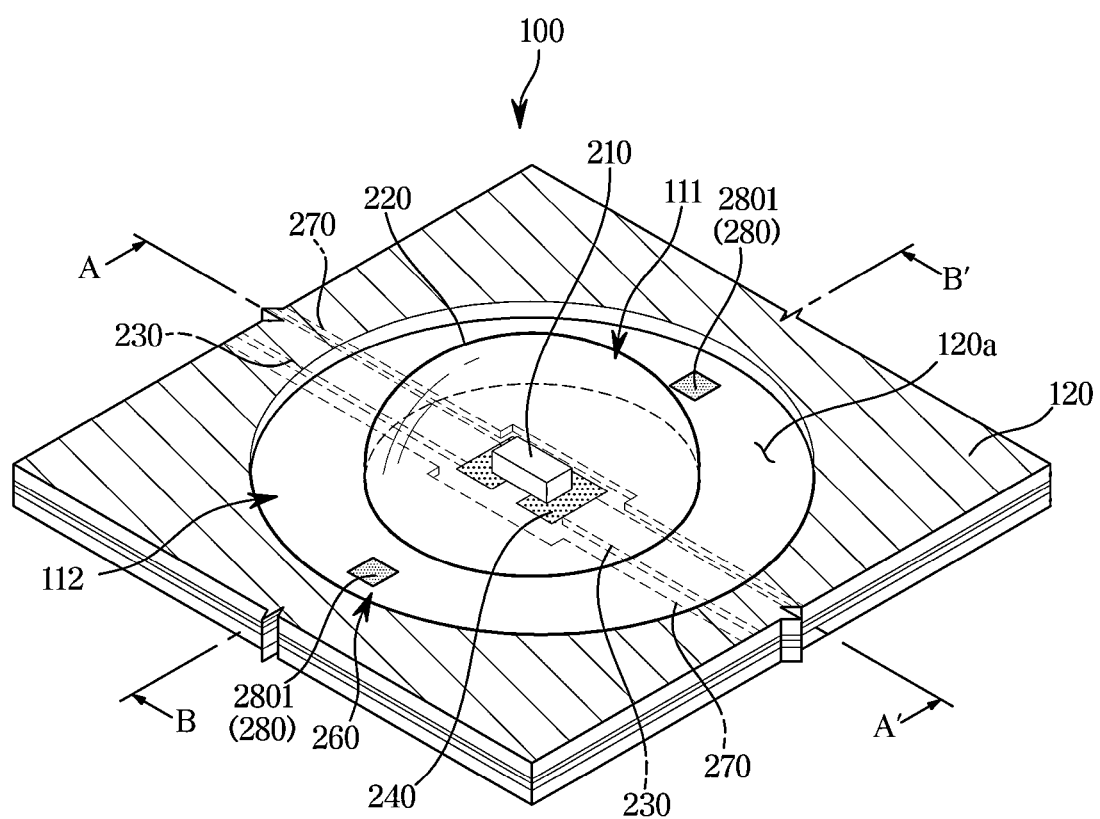
FIG. 6 illustrates a perspective view of a light source included in the light source device according to some embodiments.
Figure 7:
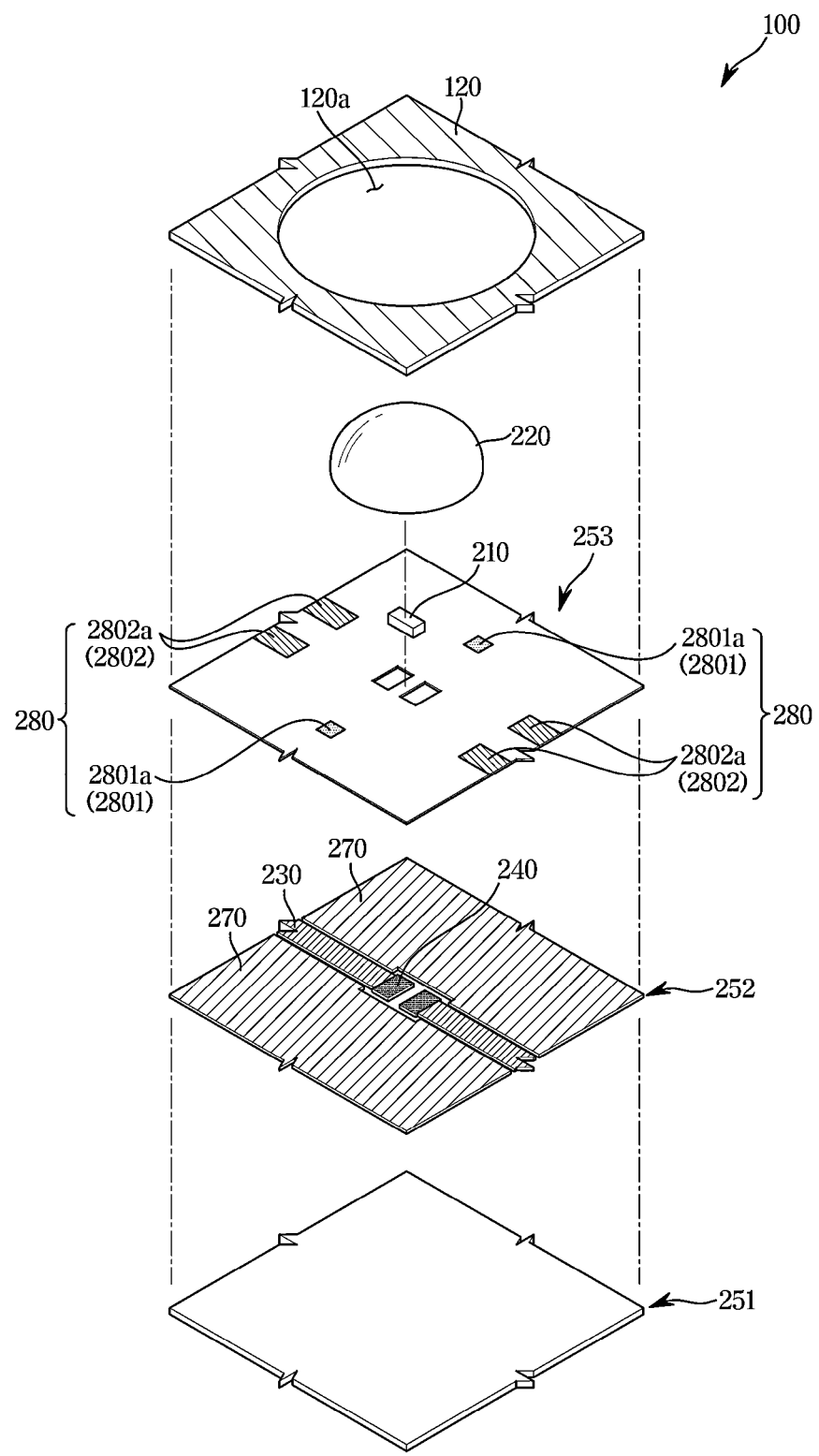
FIG. 7 illustrates an exploded view of the light source shown in FIG. 6.
Figure 8:
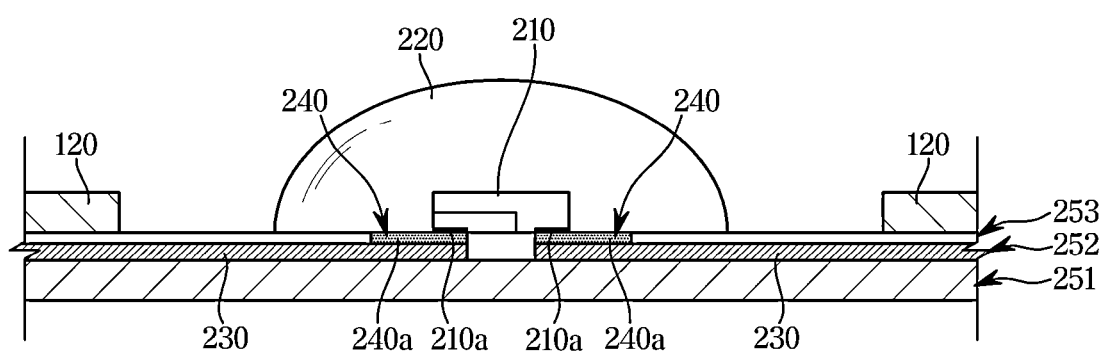
FIG. 8 illustrates a cross-sectional view taken along line A-A' shown in FIG. 6.
Figure 9:
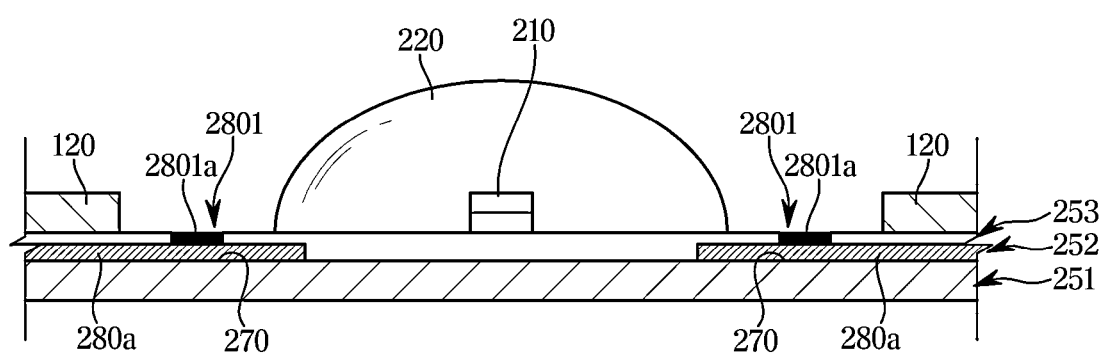
FIG. 9 illustrates a cross-sectional view taken along line B-B' shown in FIG. 6.
Figure 10:
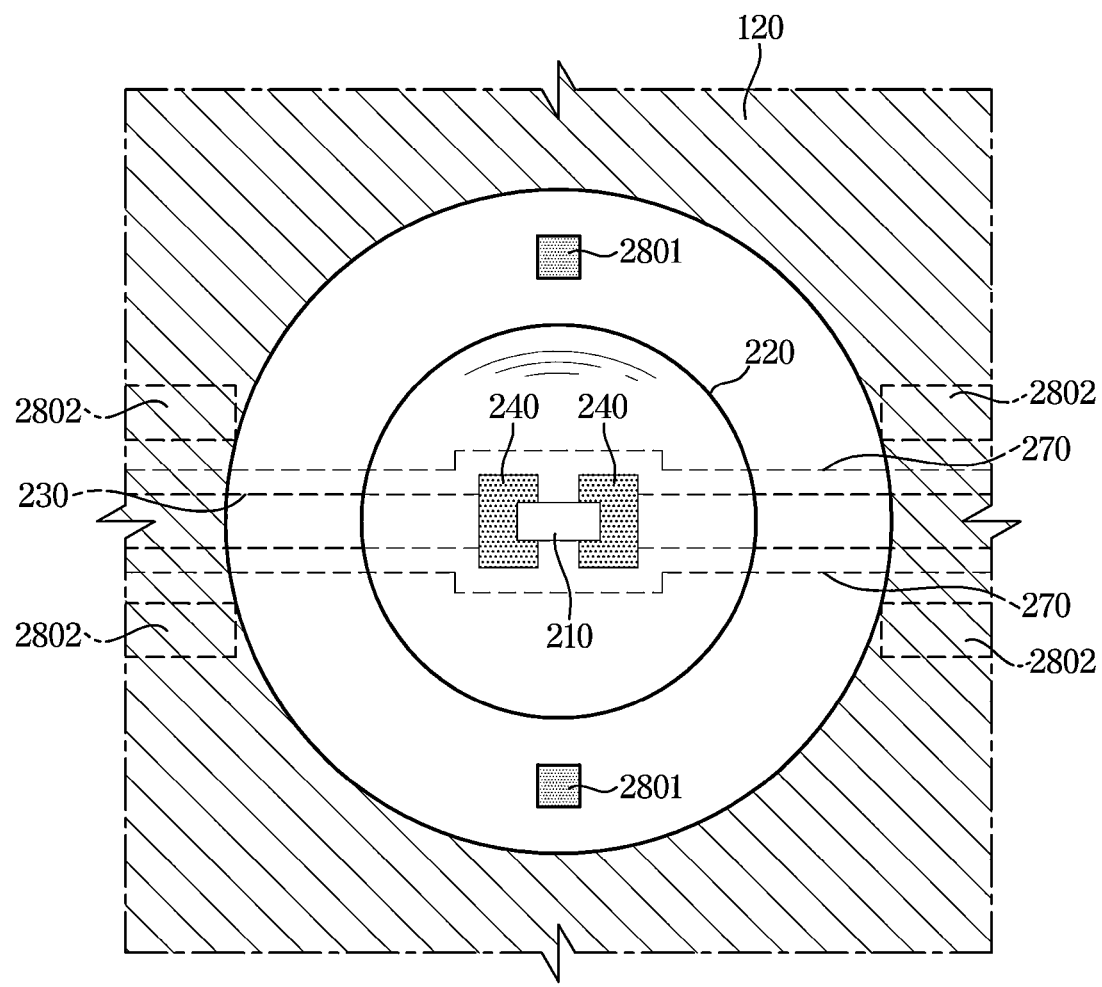
FIG. 10 illustrates a top view of the light source included in the light source device according to some embodiments.
Figure 11:
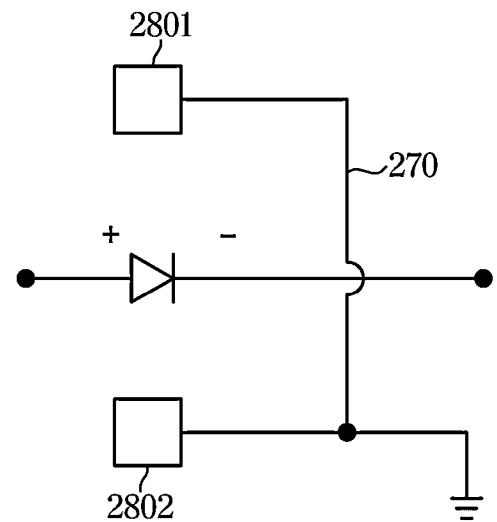
FIG. 11 illustrates an equivalent circuit of the light source included in the light source device according to some embodiments.
Figure 11:
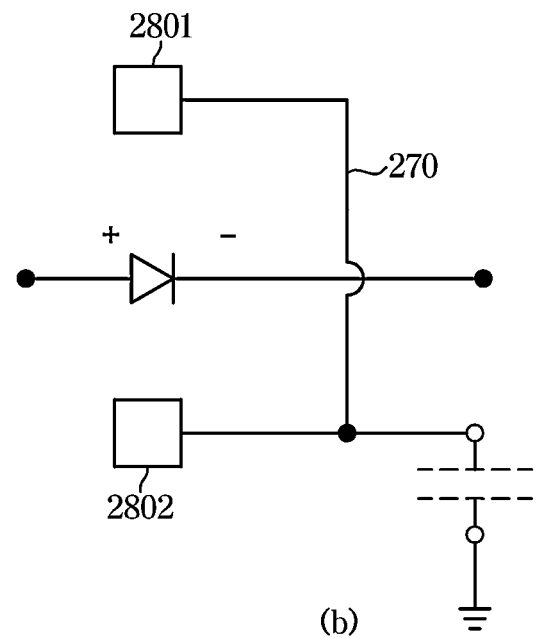
Figure 12:
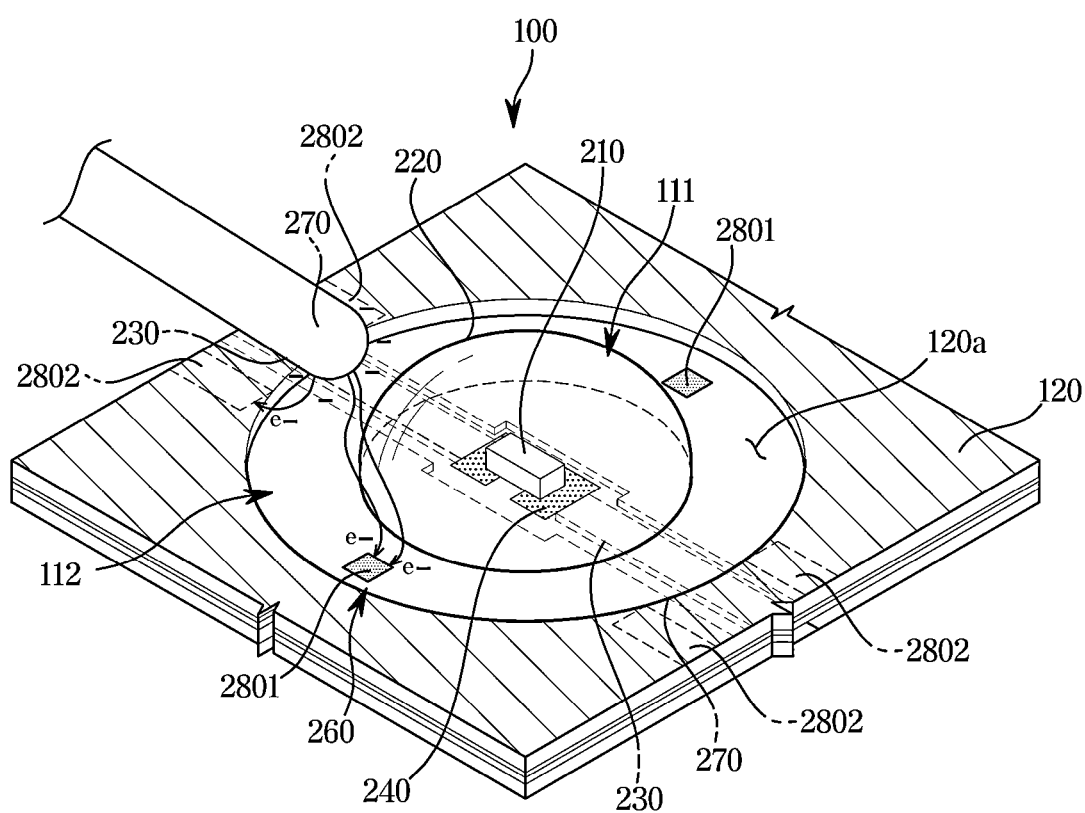
FIG. 12 illustrates an electrostatic discharge in the light source included in the light source device according to some embodiments.

FIG. 6 illustrates a perspective view of a light source included in the light source device according to some embodiments. FIG. 7 illustrates an exploded view of the light source shown in FIG. 6. FIG. 8 illustrates a cross-sectional view taken along line A-A' shown in FIG. 6. FIG. 9 illustrates a cross-sectional view taken along line B-B' shown in FIG. 6. FIG. 10 illustrates a top view of the light source included in the light source device according to some embodiments. FIG. 11 illustrates an equivalent circuit of the light source included in the light source device according to some embodiments. FIG. 12 illustrates an example of electrostatic discharge in the light source included in the light source device according to some embodiments.

The light source 111 of the light source device 100 will be described with reference to FIGS. 6 to 12.

As described above, the light source module 110 may include the plurality of light sources 111. The plurality of light sources 111 may protrude forward of the reflective sheet 120 from the rear of the reflective sheet 120 by passing through the through-hole 120a. Accordingly, as illustrated in FIGS. 6 and 7, the light source 111 and a portion of the substrate 112 may be exposed toward the front of the reflective sheet 120 through the through-hole 120a.

The light source 111 may include an electrical/mechanical structure disposed in a region defined by the through-hole 120a of the reflective sheet 120.

Each of the plurality of light sources 111 may include a light emitting diode 210 and an optical dome 220.

In order to increase the uniformity of surface light emitted from the light source device 100 and to improve the contrast ratio by local dimming, the number of light sources 111 may be increased. As a result, a region occupied by each of the plurality of light sources 111 may be reduced.

In order to reduce an area of the region occupied by each of the plurality of light sources 111, an antistatic circuit (for example, Zener diode) to prevent or suppress damage to the light emitting diode 210 due to electrostatic discharge may be omitted in the light source 111. In other words, the light source 111 may not include a Zener diode connected in parallel with the light emitting diode 210.

The light emitting diode 210 may include a P-type semiconductor and an N-type semiconductor for emitting light by recombination of holes and electrons. In addition, the light emitting diode 210 may be provided with a pair of electrodes 210a for supplying hole and electrons to the P-type semiconductor and the N-type semiconductor, respectively.

The light emitting diode 210 may convert electrical energy into optical energy. In other words, the light emitting diode 210 may emit light having a maximum intensity at a predetermined wavelength to which power is supplied. For example, the light emitting diode 210 may emit blue light having a peak value at a wavelength indicating blue color (for example, a wavelength between 450 nm and 495 nm).

The light emitting diode 210 may be directly attached to the substrate 112 in a Chip On Board (COB) method. In other words, the light source 111 may include the light emitting diode 210 to which a light emitting diode chip or a light emitting diode die is directly attached to the substrate 112 without an additional packaging.

In order to reduce a region occupied by the light emitting diode 210, the light emitting diode 210 may be manufactured as a flip chip type that does not include a Zener diode. As for the flip chip type light emitting diode 210, when the light emitting diode corresponding to a semiconductor device is attached to the substrate 112, an electrode pattern of the semiconductor device may be fused to the substrate 112 without an intermediate medium such as a metal lead (wire) or ball grid array (BGA).

Accordingly, because the metal lead (wire) or ball grid array is omitted, it is possible to reduce a size of the light source 111 including the flip chip type light emitting diode 210.

In order to reduce the size of the light source 111, the light source module 110, in which the flip-chip type light emitting diode 210 is attached to the substrate 112 in a chip-on-board method, may be manufactured.

On the substrate 112, a feeding line 230 and a feeding pad 240 for supplying power to the flip-chip type light emitting diode 210 is provided.

On the substrate 112, the feeding line 230 for supplying electrical signals and/or power to the light emitting diode 210 from the control assembly 50 and/or the power assembly 60 may be provided.

As illustrated in FIG. 8, the substrate 112 may be formed by alternately laminating an insulation layer 251 (i.e. second layer) that is non-conductive and a conduction layer 252 (i.e. first layer) that is conductive.

A line or pattern, through which power and/or electrical signals pass, may be formed on the conduction layer 252. The conduction layer 252 may be formed of various materials having an electrical conductivity. For example, the conduction layer 252 may be formed of various metal materials, such as copper (Cu), tin (Sn), aluminum (Al), or an alloy thereof.

A dielectric of the insulation layer 251 may insulate between lines or patterns of the conduction layer 252. The insulation layer 251 may be formed of a dielectric for electrical insulation, such as FR-4.

The feeding line 230 may be implemented by a line or pattern formed on the conduction layer 252.

The feeding line 230 may be electrically connected to the light emitting diode 210 through the feeding pad 240.

The feeding pad 240 may be formed in such a way that the feeding line 230 is exposed to the outside.

A protection layer 253 configured to prevent or suppress damages caused by an external impact and/or damages caused by a chemical action (for example, corrosion, etc.) and/or damages caused by an optical action, to the substrate 112 may be formed at an outermost part of the substrate 112. The protection layer 253 may include a photo solder resist (PSR).

As illustrated in FIG. 8, the protection layer 253 may cover the feeding line 230 to prevent the feeding line 230 from being exposed to the outside.

For electrical contact between the feeding line 230 and the light emitting diode 210, a window may be formed in the protection layer 253 to expose a portion of the feeding line 230 to the outside. A portion of the feeding line 230 exposed to the outside through the window of the protection layer 253 may form the feeding pad 240.

A conductive adhesive material 240a for the electrical contact between the feeding line 230 exposed to the outside and the electrode 210a of the light emitting diode 210 may be applied to the feeding pad 240. The conductive adhesive material 240a may be applied within the window of the protection layer 253.

The electrode 210a of the light emitting diode 210 may be in contact with the conductive adhesive material 240a, and the light emitting diode 210 may be electrically connected to the feeding line 230 through the conductive adhesive material 240a.

The conductive adhesive material 240a may include a solder having an electrical conductivity. However, the disclosure is not limited thereto, and the conductive adhesive material 240a may include electrically conductive epoxy adhesives.

Power may be supplied to the light emitting diode 210 through the feeding line 230 and the feeding pad 240, and in response to the supply of the power, the light emitting diode 210 may emit light. A pair of feeding pads 240 corresponding to each of the pair of electrodes 210a provided in the flip chip type light emitting diode 210 may be provided.

The optical dome 220 may cover the light emitting diode 210. The optical dome 220 may prevent or suppress damages to the light emitting diode 210 caused by an external mechanical action and/or damage to the light emitting diode 210 caused by a chemical action.

The optical dome 220 may have a dome shape formed in such a way that a sphere is cut into a surface not including the center thereof, or may have a hemispherical shape in such a way that a sphere is cut into a surface including the center thereof. A vertical cross section of the optical dome 220 may be a bow shape or a semicircle shape.

The optical dome 220 may be formed of silicone or epoxy resin. For example, the molten silicon or epoxy resin may be discharged onto the light emitting diode 210 through a nozzle, and the discharged silicon or epoxy resin may be cured, thereby forming the optical dome 220.

Accordingly, the shape of the optical dome 220 may vary depending on the viscosity of the liquid silicone or epoxy resin. For example, in a state in which the optical dome 220 is manufactured using silicon having a thixotropic index of about 2.7 to 3.3 (appropriately, 3.0), the optical dome 220 may include a dome ratio, indicating a ratio of a height of a dome to a diameter of a base of the dome (a height of the dome/a diameter of a base), of approximately 2.5 to 3.1 (appropriately 2.8). For example, the optical dome 220 formed of silicon having a thixotropic index of approximately 2.7 to 3.3 (appropriately, 3.0) may have a diameter of the base of approximately 2.5 mm and a height of approximately 0.7 mm.

The optical dome 220 may be optically transparent or translucent. Light emitted from the light emitting diode 210 may be emitted to the outside by passing through the optical dome 220.

In this case, the dome-shaped optical dome 220 may refract light like a lens. For example, light emitted from the light emitting diode 210 may be refracted by the optical dome 220 and thus may be dispersed.

As mentioned above, the optical dome 220 may disperse light emitted from the light emitting diode 210 as well as protecting the light emitting diode 210 from external mechanical and/or chemical or electrical actions.

An antistatic member 260 is formed near the optical dome 220 to protect the light emitting diode 210 from electrostatic discharge.

The antistatic member 260 may absorb electrical shock caused by electrostatic discharge generated near the optical dome 220.

As mentioned above, the optical dome 220 may protect the light emitting diode 210 from external electrical action. Charges generated by electrostatic discharge may not pass through the optical dome 220, but may flow along an outer surface of the optical dome 220. Charges flowing along the outer surface of the optical dome 220 may reach the light emitting diode 210 along a boundary between the optical dome 220 and the substrate 112. The light emitting diode 210 may be damaged due to electrical shock caused by charges penetrating along the boundary between the optical dome 220 and the substrate 112. To prevent or suppress the flow of electric charges, that is, current, the antistatic member 260 may be provided near the optical dome 220.

The antistatic member 260 includes an antistatic line 270 and an antistatic pad 280.

The antistatic line 270 may provide a path for a current due to electrostatic discharge generated near the optical dome 220. In other words, the antistatic line 270 may guide the electric charges caused by electrostatic discharge to move to the ground. The antistatic line 270 may be formed of the same material as the feeding line 230. For example, the antistatic line 270 may be formed of various metal materials such as copper (Cu), tin (Sn), aluminum (Al), or alloys thereof.

For example, the substrate 112 may be formed by alternately laminating the insulation layer 251 that is non-conductive and the conduction layer 252 that is conductive. The conduction layer 252 may be formed of various metal materials such as copper (Cu), tin (Sn), aluminum (Al), or alloys thereof.

The antistatic line 270 may be implemented by a line or pattern formed on the conduction layer 252.

As illustrated in FIG. 9, the antistatic line 270 may be exposed to the outside through the antistatic pad 280.

The protection layer 253 may cover the antistatic line 270 to block the antistatic line 270 from being exposed to the outside. A window may be formed in the protection layer 253 to form the antistatic pad 280 provided to collect a current due to electrostatic discharge. The antistatic line 270 may be exposed to the outside through the window of the protection layer 253, and a portion of the antistatic line 270 exposed to the outside may form the antistatic pad 280.

The antistatic pad 280 may be provided separately from the feeding pad 240 that is in contact with the light emitting diode 210, and the antistatic pad 280 may not be in contact with the light emitting diode 210.

As illustrated in FIGS. 9 and 10, the antistatic pad 280 may include a first antistatic pad 2801 and a second antistatic pad 2802.

A plurality of first antistatic pads 2801 may be provided and disposed on both sides of the optical dome 220.

The pair of first antistatic pads 2801 may be maximally spaced apart from each other on a circumference of a virtual circle surrounding the light source 111. For example, the pair of first antistatic pads 2801 may be arranged at angular intervals of approximately 180 degrees along the circumference of the virtual circle surrounding the optical dome 220.

However, the arrangement of the first antistatic pad 2801 is not limited to that shown in FIG. 10, and the first antistatic pad 2801 may be disposed at any position as long as the first antistatic pad 2801 is configured to prevent or suppress a current, which caused by electrostatic discharge, from moving to the light emitting diode 210 along the feeding line 230 or the boundary between the optical dome 220 and the substrate 112. For example, the first antistatic pad 2801 may be arranged at angular intervals of approximately 90 degrees or 120 degrees along the circumference of the virtual circle surrounding the optical dome 220.

The first antistatic pad 2801 may be disposed within a region defined by the through-hole 120a, and the second antistatic pad 2802 may be disposed outside the region defined by the through-hole 120a. Accordingly, the first antistatic pad 2801 may not be covered by the reflective sheet 120 and the second antistatic pad 2802 may be covered by the reflective sheet 120.

Particularly, the first antistatic pad 2801 and the second antistatic pad 2802 may be formed on the protection layer 253 of the substrate 112 and may include silver plating layers 2801a and 2802a, respectively.

At a position spaced apart by a first length d2 (refer to FIG. 14) in a width direction of the feeding line 230, the second antistatic pad 2802 may extend in a longitudinal direction of the feeding line 230.

Details regarding the shape of the second antistatic pad 2802 will be described later.

A size of the first antistatic pad 2801 may depend on various factors. For example, as the size of the first antistatic pad 2801 increases, a potential difference that prevents or suppresses a current due to electrostatic discharge from moving to the light emitting diode 210 may increase. In other words, as the size of the first antistatic pad 2801 increases, the antistatic performance of the first antistatic pad 2801 improves.

On the other hand, as the size of the first antistatic pad 2801 increases, optical interference of the first antistatic pad 2801 may increase. Monochromatic light (for example, blue light) emitted from the light source 111 may be reflected by the first antistatic pad 2801.

While monochromatic light is reflected from the first antistatic pad 2801, an intrinsic color of the first antistatic pad 2801 may be added. For example, the monochromatic light emitted from the light source 111 may be blue light with one peak value in a wavelength range between 450 nm and 495 nm. At this time, the spectrum of light reflected from the first antistatic pad 2801 may have a plurality of peaks, and at least some of the plurality of peaks may deviate from the wavelength range between 450 nm and 495 nm. In other words, due to the first antistatic pad 2801, light having a peak outside the wavelength range of monochromatic light may be emitted.

As mentioned above, the spectrum of light emitted from the light source 111 may be distorted due to the first antistatic pad 2801, which may reduce the color gamut of the display apparatus 10. In addition, distortion of the spectrum of light emitted from the light source 111 may cause a Mura phenomenon.

Accordingly, the size of the first antistatic pad 2801 may be determined by considering antistatic performance and color distortion.

The size of the first antistatic pad 2802 with the consideration of the antistatic performance may depend on the size of the optical dome 220.

It is appropriate that a ratio between an area of the base of the optical dome 220 and an area of the first antistatic pad 2801 is at least 1:0.0016 or more. When the diameter of the base of the optical dome 220 is 2.5 mm (a radius is 1250 μm, and an area is approximately 4,900,000 μm²), the area of the first antistatic pad 2801 may be approximately 7,900 μm² or more. In the case of the circular first antistatic pad 2801, a diameter of the first antistatic pad 2801 may be approximately 50 μm or more. Additionally, in the case of the square first antistatic pad 2801, a side length of the first antistatic pad 2801 may be approximately 90 μm or more. For example, it is appropriate that the area of the first antistatic pad 2801 is approximately 62,500 μm² (the ratio between the area of the base of the optical dome and the area of the antistatic pad is approximately 1:0.013). In the case of the circular first antistatic pad 2801, it is appropriate that the diameter of the first antistatic pad 2801 is approximately 140 μm. Additionally, in the case of the square first antistatic pad 2801, it is appropriate that the side length of the first antistatic pad 2801 is approximately 250 μm.

This is only an example of the ratio between the area of the base of the optical dome 220 and the area of the first antistatic pad 2801, and is not limited to the above ratio.

The position of the first antistatic pad 2801 (a distance to the optical dome) with the consideration of the antistatic performance may depend on the size of the optical dome 220.

The first antistatic pad 2801 may have higher antistatic performance at a closer distance to the outer surface of the optical dome 220. However, when the first antistatic pad 2801 is located inside the outer surface of the optical dome 220, the optical interference may occur. Therefore, it is appropriate that the first antistatic pad 2801 is located outside an outline of the optical dome 220. It is appropriate that at least a portion of the first antistatic pad 2801 is exposed to the outside of the region defined by the optical dome 220.

In addition, in order to prevent or suppress electrostatically discharged charges from reaching the feeding pad 240, it is appropriate that a shortest distance from the outline of the optical dome 220 to the first antistatic pad 2801 is less than a shortest distance from the outline of the optical dome 220 to the feeding pad 240.

It is appropriate that the shortest distance from the outline of the optical dome 220 to the first antistatic pad 2801 is less than the radius of the optical dome 220. When the diameter of the base of the optical dome 220 is 2.5 mm (a radius is 1250 μm), the distance from the outline of the optical dome 220 to the first antistatic pad 2801 may be approximately 1250 μm or less. For example, it is appropriate that the shortest distance from the outline of the optical dome 220 to the first antistatic pad 2801 is 500 μm or less.

An equivalent circuit of the light source 111 including the light emitting diode 210 and the antistatic member 260 is as illustrated in FIGS. 11(a) and 11(b).

The light emitting diode 210 is electrically connected to the feeding line 230 through the feeding pad 240, and first and second antistatic pads 281 and 282 are provided near the light emitting diode 210.

As illustrated in FIG. 11(a), the first and second antistatic pads 281 and 282 may be connected to the ground by the antistatic line 270. Charges collected in the first and second antistatic pads 2801 and 2802 may flow to the ground along the antistatic line 270.

In addition, as illustrated in FIG. 11(b), the antistatic line 270 connected to the first and second antistatic pads 2801 and 2802 may not be directly connected to the ground, and may be coupled to the ground by parasitic capacitance. Charges collected by the first and second antistatic pads 2801 and 2802 may flow to the ground along the antistatic line 270 by the parasitic capacitance.

By the antistatic member 260, the electrostatic discharge tolerance of the light source 111 may be improved.

For example, as illustrated in FIG. 12, when a negatively charged object CO approaches the light source 111 or is in contact with the light source 111, negative charges may be emitted from the charged object CO.

The emitted negative charges may not pass through the inside of the optical dome 220 formed of a non-conductive material, but may move along the outer surface of the optical dome 220.

The negative charges moving along the outer surface of the optical dome 220 may move to the first and second antistatic pads 2801 and 2802 along the outer surface of the substrate 112 at the boundary between the optical dome 220 and the substrate 112, or may move to the feeding pad 240 along the boundary between the optical dome 220 and the substrate 112.

When the outer surface of the optical dome 220 is located close to the first and second antistatic pads 2801 and 2802, most of the negative charges may move to the first and second antistatic pads 2801 and 2802, and only a small portion of the negative charges may move to the feeding pad 240. In other words, a current due to electrostatic discharge may flow to the ground through the first and second antistatic pads 2801 and 2802, and only a very small current may flow to the light emitting diode 210 through the feeding pad 240.

Accordingly, the electrostatic discharge tolerance of the light source 111 may be improved. In other words, a voltage due to electrostatic discharge, which the light source 111 is capable of tolerating may increase.

According to the experiment, the electrostatic discharge tolerance of the light source using an optical dome with a base diameter of 2.5 mm and a height of 0.7 mm is measured to be approximately 3 kV. On the other hand, when the first antistatic pad 2801 with dimensions of 0.5 mm×0.5 mm is placed within 0.5 mm from the optical dome having the same size, the electrostatic discharge tolerance of the light source is improved to approximately 10 kV.

Figure 13:
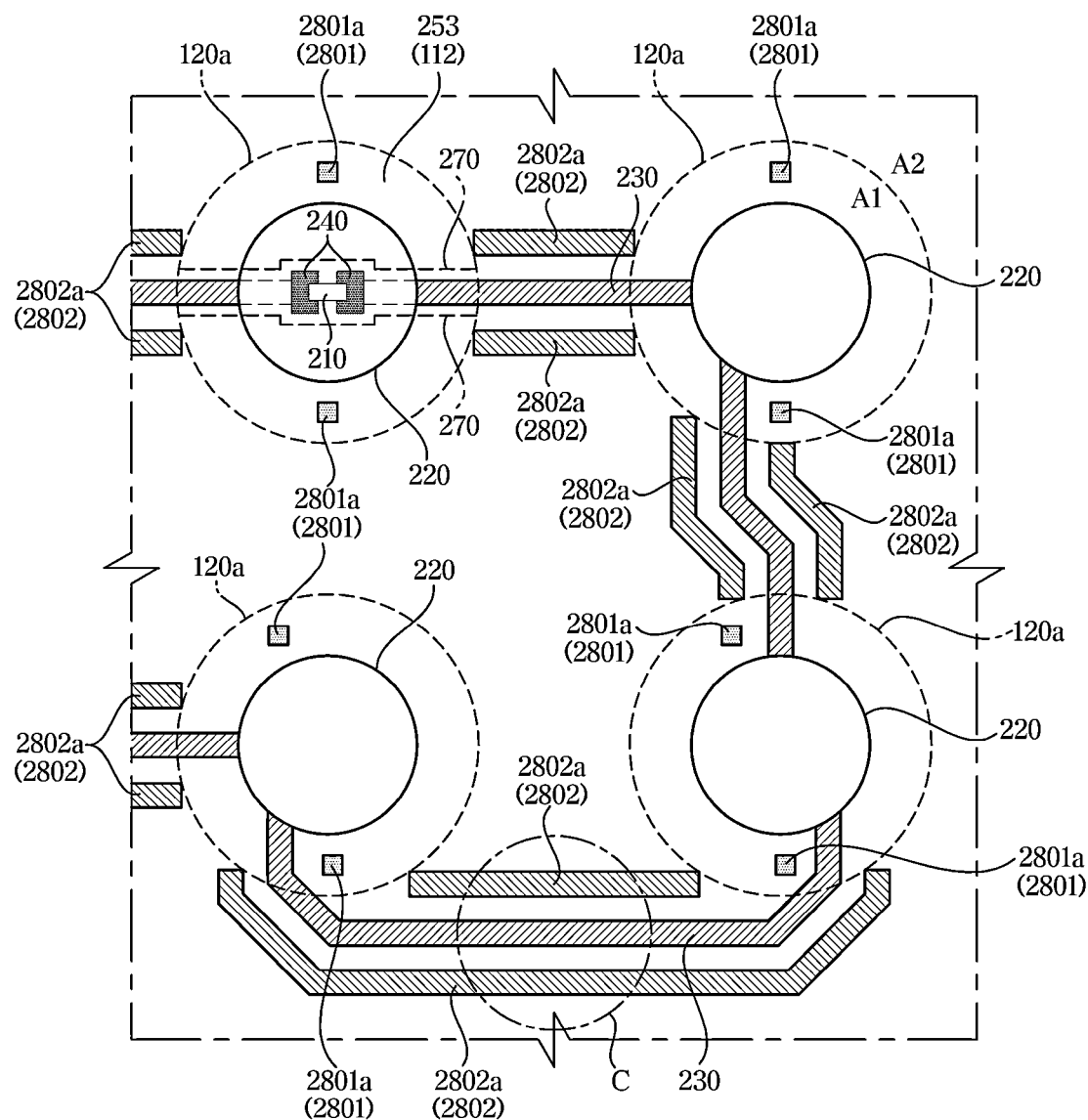
FIG. 13 illustrates a top view of a first antistatic pad and a second antistatic pad included in the light source device according to some embodiments.
Figure 14:
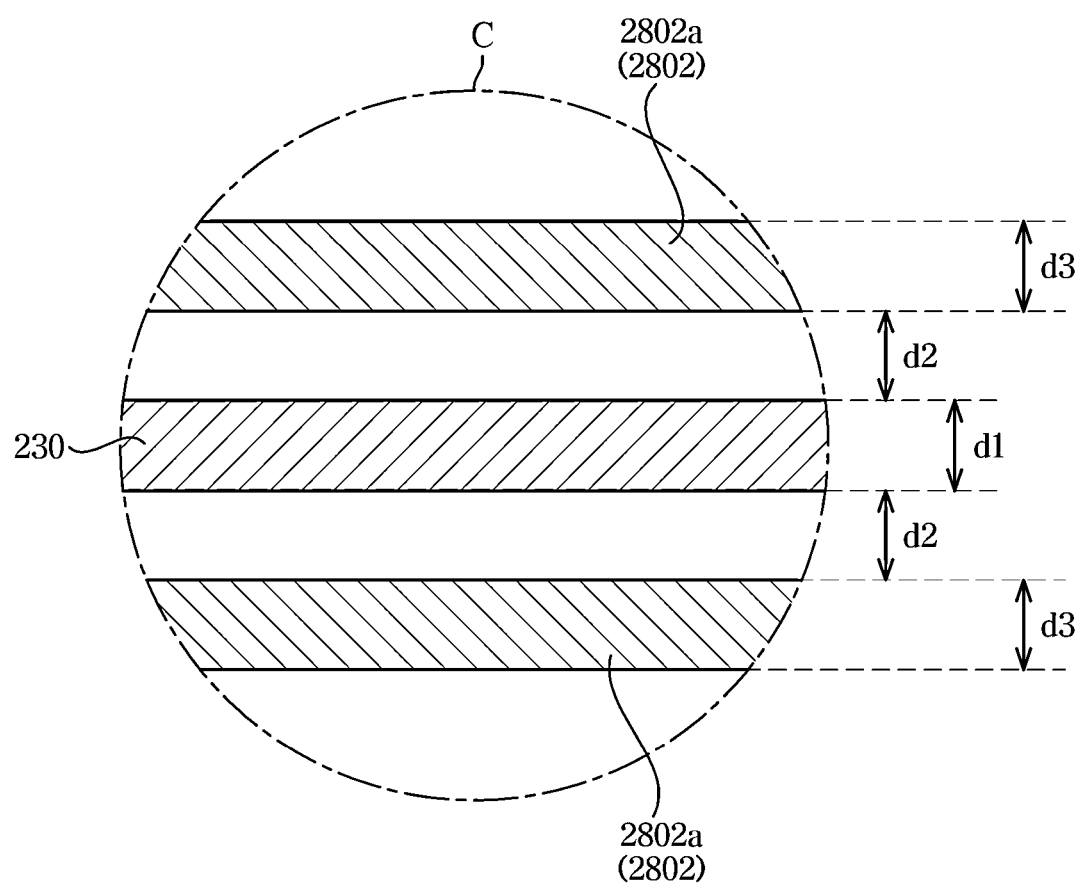
FIG. 14 illustrates an enlarged view of portion C of FIG. 13.

FIG. 13 illustrates a top view of a first antistatic pad and a second antistatic pad included in the light source device according to some embodiments. FIG. 14 illustrates an enlarged view of portion C of FIG. 13.

FIG. 13 illustrates the light source device 100 including the light source module 110, in which four light sources 111 arranged adjacent to each other are arranged on the substrate 112 along a certain pattern, and the reflective sheet 120 provided to cover a portion of the light source module 110.

The four adjacent light sources 111 may be arranged to form approximately a square.

The feeding line 230 may be electrically connected to the light emitting diode 210 through the feeding pad 240. The feeding line 230 may be implemented by the line or pattern formed on the conduction layer 252. The protection layer 253 may be disposed in an upper portion of the conduction layer 252, and the protection layer 253 of the substrate 112 may display a pattern corresponding to the feeding line 230 of the conduction layer 252. FIG. 13 illustrates the pattern of the feeding line 230, for convenience. The pattern formed on the protection layer 253 may be formed to have the same width as the width of the feeding line 230.

The antistatic pad 280 formed on the protection layer 253 of the substrate 112 may include the first antistatic pad 2801 and the second antistatic pad 2802.

The first antistatic pad 2801 may include a first silver plating layer 2801a. The second antistatic pad 2802 may include a second silver plating layer 2802a.

The protection layer 253 may be generally formed of an insulator and may protect the feeding circuit, such as the feeding line 230, from electrostatic discharge. However, because the protection layer 253 is thinner than the optical dome 220, a voltage level that protects the feeding circuit such as the feeding line 230 from electrostatic discharge may be lower than that of the optical dome 220. As a result, the electric charges may penetrate into the feeding line 230 due to electrostatic discharge occurring near the feeding line 230 and the electric charges may damage the light emitting diode 210 through the feeding line 230.

Accordingly, in order to prevent or suppress the penetration of the electric charges through the feeding line 230, the second antistatic pad 2802 may be provided near the feeding line 230.

Particularly, the second antistatic pad 2802 may be disposed along the feeding line 230 on both sides of the feeding line 230.

At a position spaced apart by a first length in the width direction of the feeding line 230, the second antistatic pad 2802 may extend in the longitudinal direction of the feeding line 230.

The through-holes 120a of the reflective sheet 120 and the insulating dome 220 may be provided in plurality so as to correspond to each other. That is, as illustrated in FIG. 13, as four insulating domes 220 are provided, four through-holes 120a of the reflective sheet 120 may also be provided.

A plurality of second antistatic pads 2802 may be provided on both lateral sides of the feeding line 230 in a region between the plurality of through-holes 120a.

The first antistatic pad 2801 may be provided in a region formed by the through-hole 120a of the reflective sheet 120, and the second antistatic pad 2802 may be provided in a region that is other than the region formed by the through-hole 120a of the reflective sheet 120. In other words, the first antistatic pad 2801 and the second antistatic pad 2802 may be provided inside and outside the through-hole 120a, respectively, using the through-hole 120a as a boundary line.

On the outside of the region defined by the through-hole 120a, the second antistatic pad 2802 may extend along the longitudinal direction until the second antistatic pad 2802 is in contact with a boundary line of the region defined by the through-hole 120a of the reflective sheet 120.

Accordingly, the first antistatic pad 2801 may be exposed to the outside of the light source device 100 through the through-hole 120a of the reflective sheet 120, and the second antistatic pad 2802 may be covered by the reflective sheet 120.

Referring to FIG. 14, a width d1 of the feeding line 230 and a width d3 of the second antistatic pad 2802 may be provided to be the same.

The width d1 of the feeding line 230 may be set to be greater than or equal to 0.4 mm but less than or equal to 0.6 mm. For example, it is appropriate that the width d1 of the feeding line 230 is set to 0.5 mm.

Accordingly, the width d3 of the second antistatic pad 2802 may also be set to be greater than or equal to 0.4 mm but less than or equal to 0.6 mm. For example, it is appropriate that the width d3 of the second antistatic pad 2802 is set to 0.5 mm.

The second antistatic pad 2802 may be formed to be spaced apart from the feeding line 230 by a first length d2.

The first length d2 may be set to be greater than or equal to 0.4 mm but less than or equal to 0.6 mm. For example, it is appropriate that the first length d2 is set to 0.5 mm.

Accordingly, in the light source device 100, the width d1 of the feeding line 230, the width d3 of the second antistatic pad 2802, and the first length d2 by which the second antistatic pad 2802 and the feeding line 230 are spaced apart from each other may be provided to be the same. The width d1 of the feeding line 230, the width d3 of the second antistatic pad 2802, and the first length d2 by which the second antistatic pad 2802 and the feeding line 230 are spaced apart from each other may be set to 0.5 mm.

As the second antistatic pad 2802 formed along the feeding line 230 is provided, it is possible to prevent damage of the optical module 110 caused by electrostatic discharge generated near the feeding line 230.

In addition, the first silver plating layer 2801a and the second silver plating layer 2802a of the first antistatic pad 2801 and the second antistatic pad 2802 may be applied to the antistatic line 270 exposed to the outside through the window formed on the protection layer 253 of the substrate 112.

Particularly, the first silver plating layer 2801a and the second silver plating layer 2802a may be laminated in the upper portion of the conduction layer 252 through a displacement plating method, so as to form one surface (upper surface) of the substrate together with the protection layer 253. The conduction layer 252 may be formed of copper (Cu).

Therefore, the first silver plating layer 2801a and the second silver plating layer 2802a are included in the first antistatic pad 2801 and the second antistatic pad 2802, and thus the first antistatic pad 2801 and the second antistatic pad 2802 may have a light reflectance that is greater than a case in which the first antistatic pad 2801 and the second antistatic pad 2802 are provided as a via hole.

Accordingly, the copper color of the antistatic line 270 is not exposed to the upper surface of the substrate 112, and distortion of the spectrum of light emitted from the light source 111 may be prevented or suppressed.

Additionally, in addition to the first antistatic pad 2801 and the second antistatic pad 2802, an upper surface of the feeding pad 240 may also be plated with silver. Accordingly, a portion of the feeding pad 240, which has an area larger than the light emitting diode 210 and is exposed to the upper surface of the substrate 112, may also contribute to improving the luminance of the device.

Silver (Ag) may have a light reflectance that is more than twice that of copper (Cu).

Based on the reflectance of each metal type according to the wavelength of light, copper (Cu) has a reflectance of 90% or more in a wavelength of 600 nm or more, which emits red light. However, it can be seen that a reflectance for blue light, which has a peak value at a wavelength (for example, a wavelength between 450 nm and 495 nm) indicating blue color, is less than 45%.

On the other hand, silver (Ag) has a reflectance of 90% or more in the range from about late 300 nm to infrared wavelength that is invisible. Particularly, it has an ultra-high reflectance of 95% or more in the visible light region (a wavelength between approximately 450 nm and 800 nm) commonly used in the display apparatus.

Accordingly, the first antistatic pad 2801 and the second antistatic pad 2802 of the display apparatus and the light source device according to the present disclosure include the first silver plating layer 2801a and the second silver plating layer 2802a and the upper surface of the feeding pad 240 is plated with silver. Accordingly, the reflectance of the substrate 112 may be improved by approximately 2 times or more.

According to the experiment, an average luminance of a center portion of the existing light source device, in which copper is exposed without the silver plating layers 2801a and 2802a, is measured to be 2350 nit, and an average luminance of a center portion of the light source device including the silver plating layers 2801a and 2802a, according to present disclosure is measured to be 2480 nit, which is an improvement of approximately 5.5% compared to the existing luminance.

In addition, as a result of testing the luminance deviation between the darkest point and the brightest point, a deviation is measured to be 12.64% in the case of the existing light source device, in which copper is exposed without the silver plating layers 2801a and 2802a, and a deviation is measured to be 8.51% in the case of the light source device 100 including the silver plating layers 2801a and 2802a according to the present disclosure. Accordingly, the light source device 100 of the present disclosure may have more uniform image quality without Mura phenomenon.

Additionally, as for silver (Ag), oxidation proceeds more slowly than other metals such as copper (Cu) due to the low ionic activity of the silver, thereby preventing the metal oxidation caused by long-term storage of the substrate 112.

In addition, all metal portions exposed to the upper surface of the substrate 112 may be plated through the displacement plating with silver (Ag), and thus a coupling portion formed on the substrate 112, to which a fastening member for coupling of components of the light source device 100 is assembled, may be plated with silver (Ag). Accordingly, the storage reliability of the device may be further improved.

Further, the display apparatus and the light source device according to the present disclosure may be implemented without the reflective sheet 120.

Particularly, by plating all metal regions exposed to the protection layer 253 of the substrate 112 with silver (Ag), the image quality without Mura phenomenon, which is similar to attaching the reflective sheet 120 may be implemented without attaching the reflective sheet 120. In this case, the protection layer 253 may be thicker than when the reflective sheet 120 is attached.

When the reflective sheet 120 is not included, the first antistatic pad 2801 may be formed on the protection layer 253 that is an inside of a first region A1 formed by a virtual circle having a radius greater than that of the insulating dome 220. Further, the second antistatic pad 2802 may be formed on the protection layer 253 in a virtual second region A2 disposed outside the first region A1. At the position spaced apart by the first length d2 in the width direction of the feeding line 230, the second antistatic pad 2802 may extend in the longitudinal direction of the feeding line 230 to a region at which the second antistatic pad 2802 is in contact with the first region A1.

Accordingly, damage to the optical module 110 due to electrostatic discharge generated near the feeding line 230 may be prevented.

The arrangement pattern of the light source 111 is not limited to that shown in FIG. 13 and may be arranged in various patterns to allow light to be emitted with uniform luminance.

Accordingly, the above-described second antistatic pad 2802 may be implemented in various patterns according to various shapes and patterns of the feeding line 230 as long as the second antistatic pad 2802 is spaced apart from the feeding line 230 by the first length d2 in the width direction and extends in the longitudinal direction on both sides of the feeding line 230, and as long as the second antistatic pad 2802 is not formed in the region defined by the through-hole 120*a* of the reflective sheet 120 or is not formed inside the first region A1 formed by the virtual circle.

Further, the arrangement and shape of the first antistatic pad 2801 may be modified in various ways to improve the electrostatic discharge tolerance of the light source.

Hereinafter various arrangements and shapes of the first antistatic pad 2801 will be described.

Figure 15:
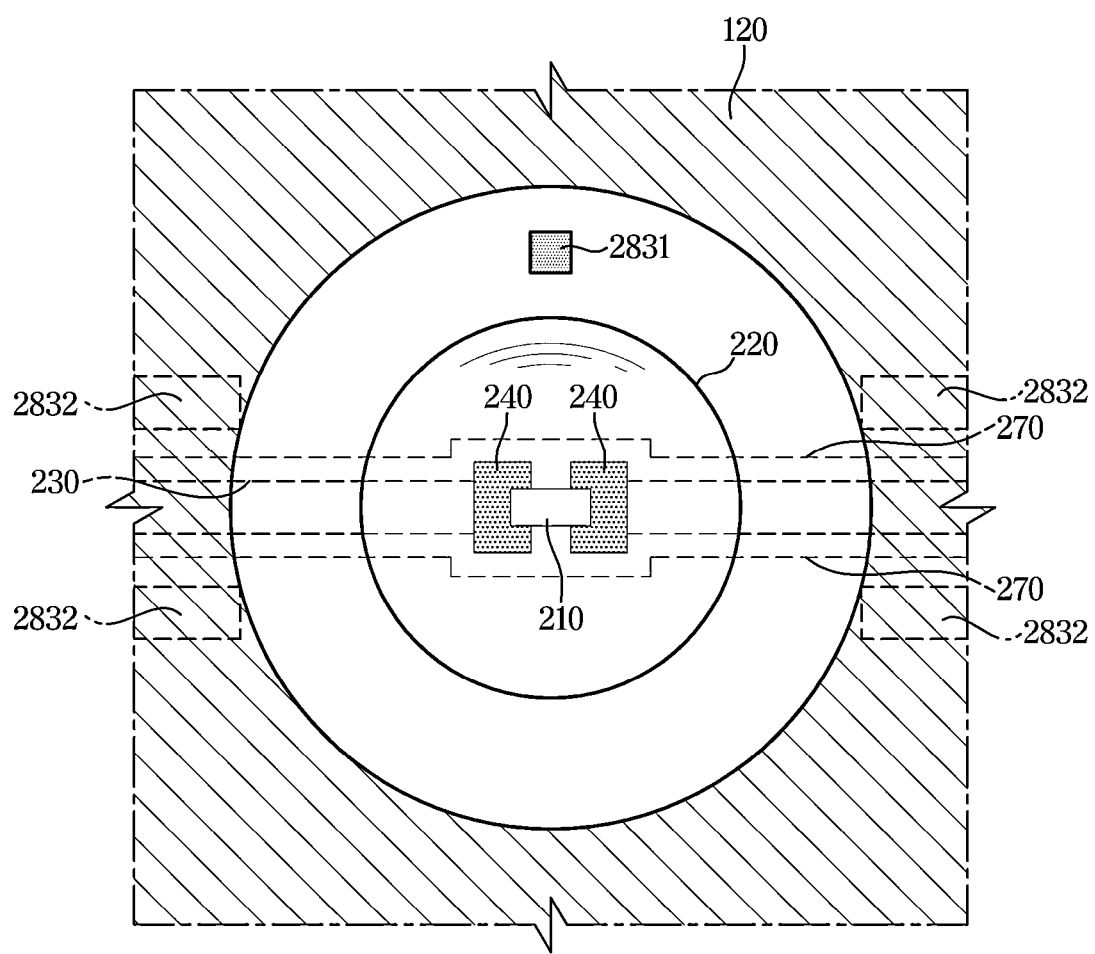
FIG. 15 illustrates a light source including one first antistatic pad, according to some embodiments.
Figure 16:
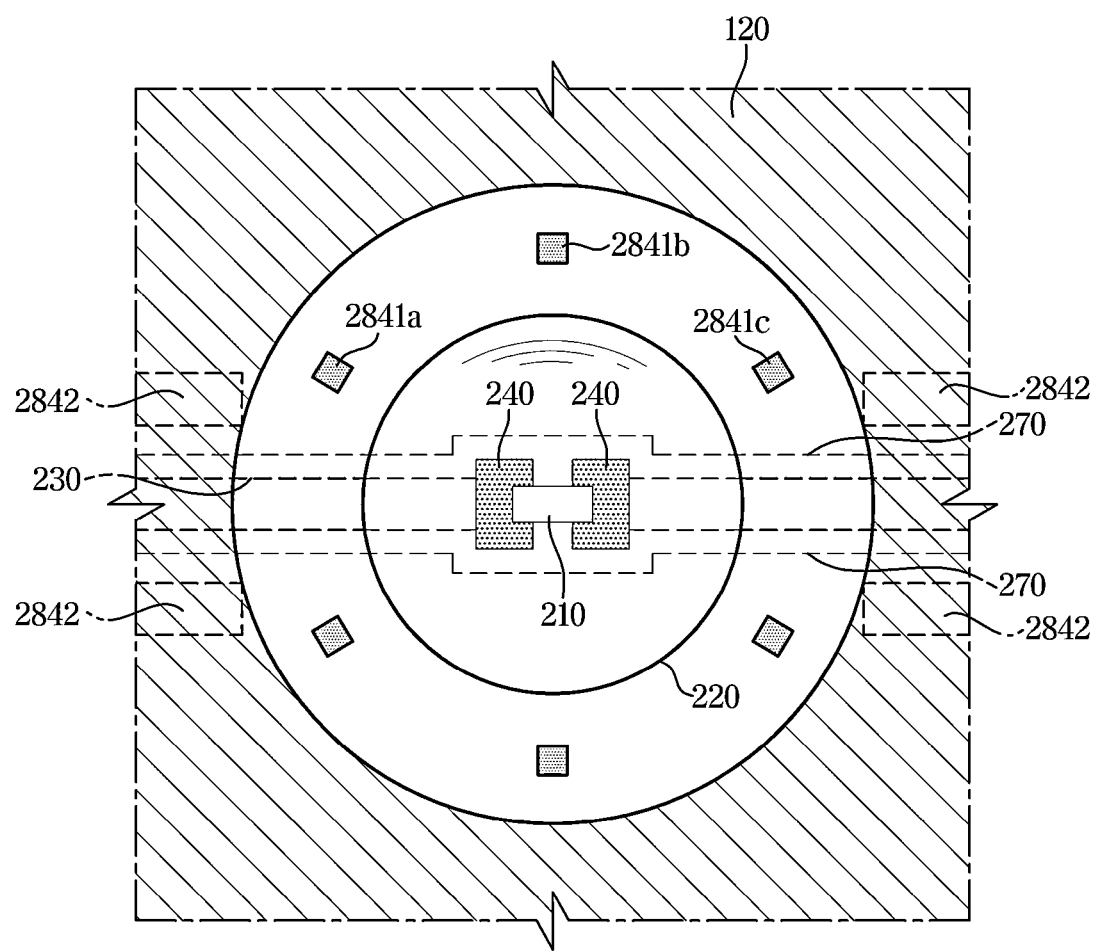
FIG. 16 illustrates a light source including three or more first antistatic pads, according to some embodiments.

FIG. 15 illustrates a light source including one first antistatic pad, according to some embodiments. FIG. 16 illustrates a light source including three or more first antistatic pads, according to some embodiments.

FIGS. 6 and 10 illustrate the first antistatic pads 2801 disposed near one light source 111, but the number of first antistatic pads 2801 is not limited to those shown in FIGS. 6 and 10.

For example, as illustrated in FIG. 15, the antistatic member 260 may include one first antistatic pad 2831 disposed near one light source 111. A structure (side cross-section) and shape of the first antistatic pad 2831 may be the same as the first antistatic pad 2801 shown in FIGS. 6 and 10. Further, a structure and shape of a second antistatic pad 2832 may be the same as those of the second antistatic pad 2802 shown in FIGS. 6 to 14.

A single first antistatic pad 2831 may be provided in a direction in which electrostatic discharge mainly occurs.

For example, when electrostatic discharge frequently occurs at a specific location of the light source device 100, the single first antistatic pad 2831 may be disposed toward the specific location. In other words, the single first antistatic pad 2831 may be disposed closer to a specific location than the light emitting diode 210 and/or the feeding pad 240 of the light source 111.

In addition, when electrostatic discharge occurs more frequently in an outer portion of the light source device 100 than in a central portion, the first antistatic pad 2831 may be provided at a location close to the outer portion of the device 100 than the light emitting diode 210 and/or the feeding pad 240 of the light source 111.

As the single one first antistatic pad 2831 is provided, the antistatic member 260 may protect the light emitting diode 210 from electrostatic discharge that frequently occurs at a specific location.

Further, by reducing the number of first antistatic pads 2831, it is possible to prevent optical interference caused by the intrinsic color of the antistatic pad 280. Accordingly, it is possible to reduce distortion of the color of light emitted from the light source device 100.

As illustrated in FIG. 14, the antistatic member 260 may include three or more first antistatic pads 2841*a*, 2841*b*, and 2841*c* provided near one light source 111. A structure and shape of each of the three or more first antistatic pads 2841*a*, 2841*b*, and 2841*c* may be the same as the above-described first antistatic pad 2801. Further, a structure and shape of a second antistatic pad 2842 may also be provided in the same as the above-described second antistatic pad 2802.

The three or more first antistatic pads 2841*a*, 2841*b*, and 2841*c* may be arranged to surround the optical dome 220.

The three or more first antistatic pads 2841*a*, 2841*b*, and 2841*c* may be maximally spaced apart from each other on a circumference of a virtual circle surrounding the optical dome 220. For example, the three or more first antistatic pads 2841*a*, 2841*b*, and 2841*c* may be arranged at approximately equal intervals along the circumference of the virtual circle surrounding the optical dome 220. The three first antistatic pads 2841*a*, 2841*b*, and 2841*c* may be arranged at angular intervals of approximately 120 degrees along the circumference of the virtual circle surrounding the optical dome 220. Alternatively, as illustrated in FIG. 16, six antistatic pads may be arranged at angular intervals of approximately 60 degrees along the circumference of the virtual circle surrounding the optical dome 220. At this time, the center of the virtual circle surrounding the optical dome 220 may be located at the light emitting diode 210 and/or the feeding pad 240.

As the three or more first antistatic pads 2841*a*, 2841*b*, and 2841*c* are provided around the optical dome 220, the antistatic member 260 may protect the light emitting diode 210 from the electrostatic discharge generated in approximately all directions with respect to the optical dome 220.

In other words, as the three or more first antistatic pads 2841*a*, 2841*b*, and 2841*c* are disposed around the optical dome 220, a distance from a position where electrostatic discharge occurs on the outer surface of the optical dome 220 to the three or more first antistatic pads 2841*a*, 2841*b*, and 2841*c* may be reduced. Accordingly, a ratio of electrostatic discharge charges collected by the three or more first antistatic pads 2841*a*, 2841*b*, and 2841*c* may be further increased, and the electrostatic discharge tolerance of the light source 111 may be further improved.

Optical interference caused by the three or more first antistatic pads 2841*a*, 2841*b*, and 2841*c* may be removed by reducing the size of each of the three or more first antistatic pads 2841*a*, 2841*b*, and 2841*c*. In other words, the size of each of the three or more first antistatic pads 2841*a*, 2841*b*, and 2841*c* may be reduced to allow a total area of the three or more first antistatic pads 2841*a*, 2841*b*, and 2841*c* to be maintained at a predetermined area.

Figure 17:
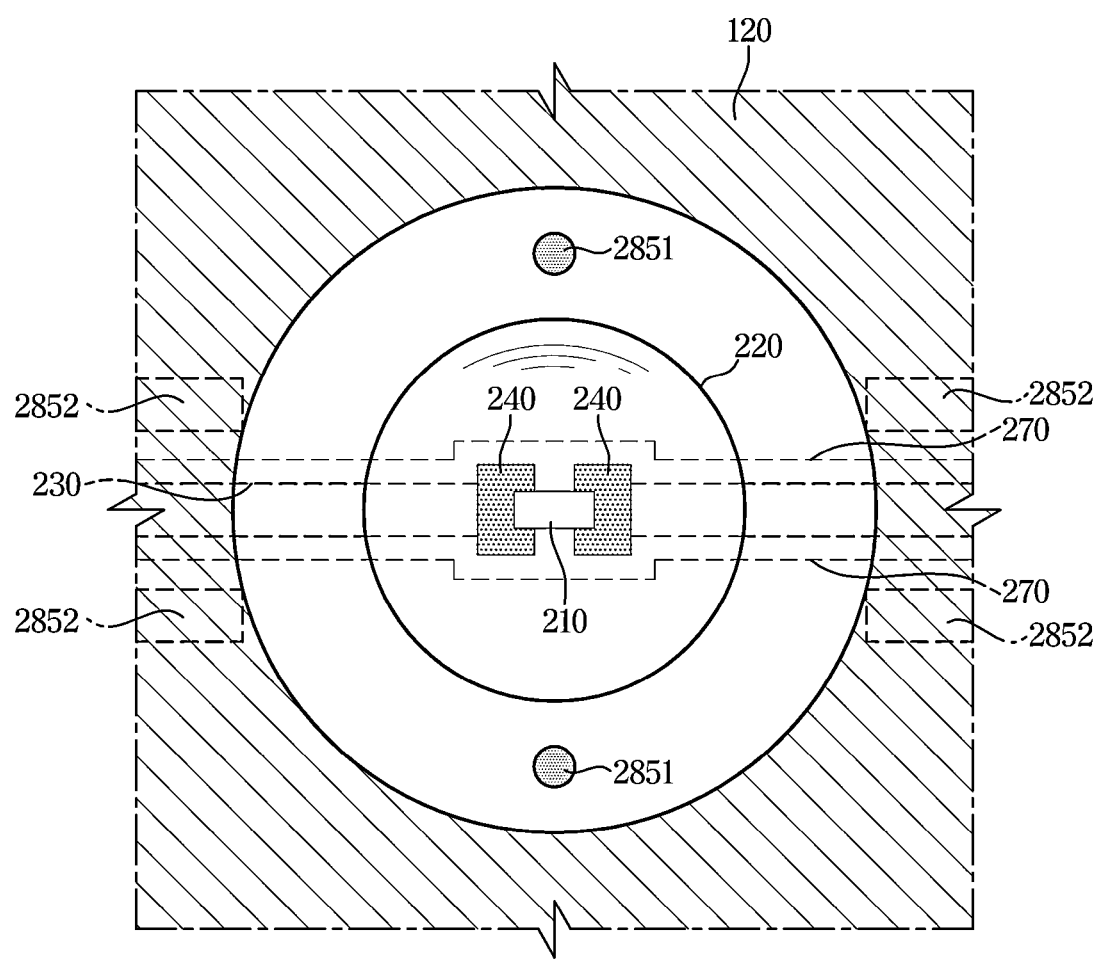
FIG. 17 illustrates a light source including a circular first antistatic pad, according to some embodiments.
Figure 18:
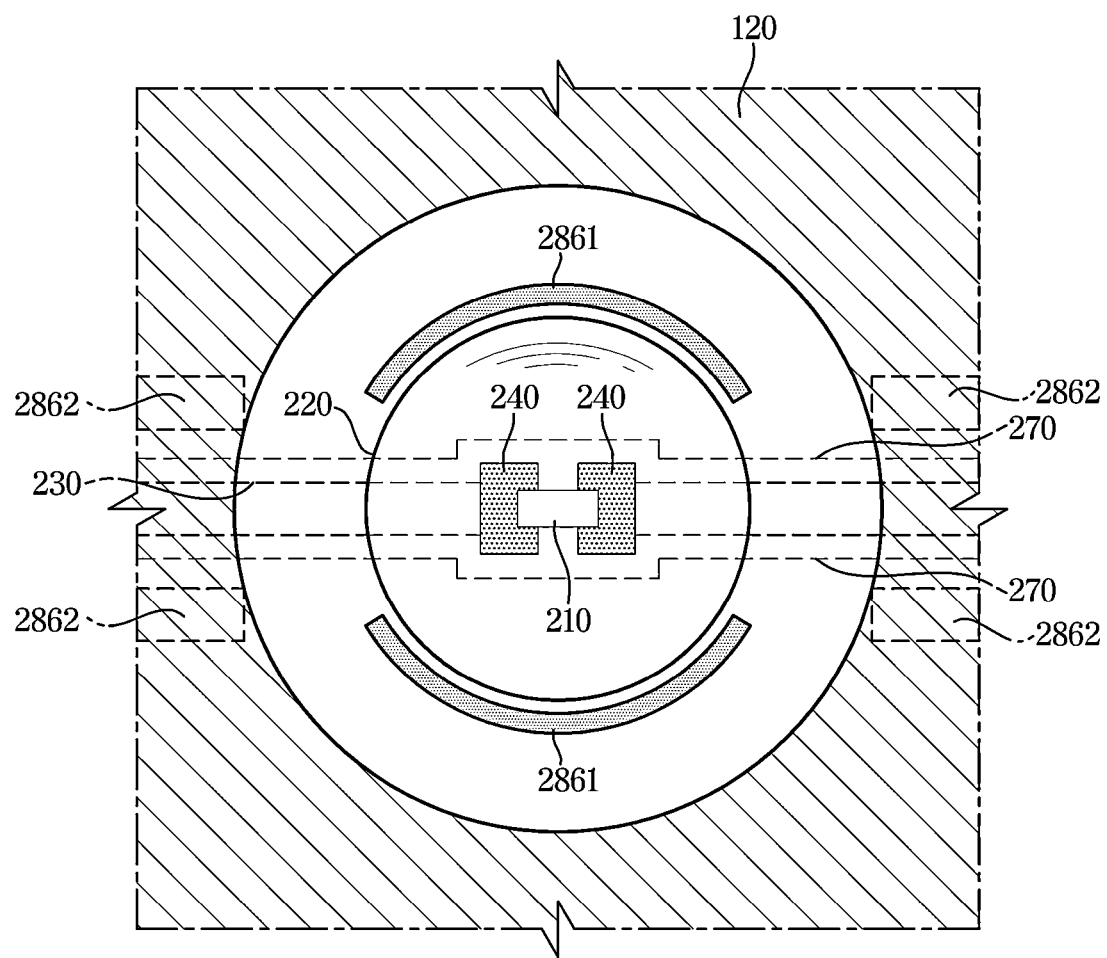
FIG. 18 illustrates a light source including a first antistatic pad having an arc shape, according to some embodiments.

FIG. 17 illustrates a light source including a circular first antistatic pad, according to some embodiments. FIG. 18 illustrates a light source including a first antistatic pad having an arc shape, according to some embodiments.

FIGS. 6 and 10 illustrate the first antistatic pad 2801 that is approximately a rectangle, but the shape of the antistatic pad 280 is not limited to that shown in FIGS. 6 and 10.

For example, as illustrated in FIG. 17, the antistatic member 260 may include a first antistatic pad 2851 that is approximately circular. A structure (side cross-section) of the circular first antistatic pad 2851 may be the same as the first antistatic pad 2801 shown in FIGS. 6 and 10. Further, a structure and shape of a second antistatic pad 2852 may also be provided in the same as the above-described second antistatic pad 2802.

Because the circular antistatic pad has no directivity, the circular antistatic pad may easily collect charges caused by electrostatic discharge generated around the first antistatic pad 2851.

The shape of the first antistatic pad 2851 is not limited to a rectangle or a circle.

For example, the shape of the first antistatic pad 2851 may be a polygon including a triangle, a rectangle, a pentagon, a hexagon, etc. In addition, the shape of the first antistatic pad 2851 may be circular, oval, semicircular, arcuate, etc.

Further, as illustrated in FIG. 18, the antistatic member 260 may include a first antistatic pad 2861 having substantially an arc shape provided to surround the optical dome 220.

A structure (side cross-section) of the arc-shaped first antistatic pad 2861 may be the same as the first antistatic pad 2801 shown in FIGS. 6 and 10. Further, a structure and shape of a second antistatic pad 2862 may also be provided in the same as the above-described second antistatic pad 2802.

The first antistatic pad 2861 shown in FIG. 18 may be an arc shape of a virtual circle surrounding the optical dome 220, which is different from the case in which the above-described three or more first antistatic pads 2841a, 2841b, and 2841c are arranged at approximately equal intervals on the circumference of the virtual circle surrounding the optical dome 220.

By providing the arc-shaped first antistatic pad 2861 surrounding the optical dome 220, the arc-shaped first antistatic pad 2861 may protect the light emitting diode 210 from the electrostatic discharge occurring in all directions with respect to the optical dome 220. In other words, as the arc-shaped first antistatic pad 2861 is disposed around the optical dome 220, a distance from the position where electrostatic discharge occurs on the outer surface of the optical dome 220 to the first antistatic pad 2861 may be further reduced. Accordingly, a ratio of electrostatic discharge charges collected by the first antistatic pad 2861 may be further increased, and the electrostatic discharge tolerance of the light source 111 may be further improved.

The shape of the first antistatic pad 2861 is not limited to an arc shape, and may also be a ring shape. In other words, the first antistatic pad 2861 may have a ring shape surrounding the optical dome 220.

Figure 19:
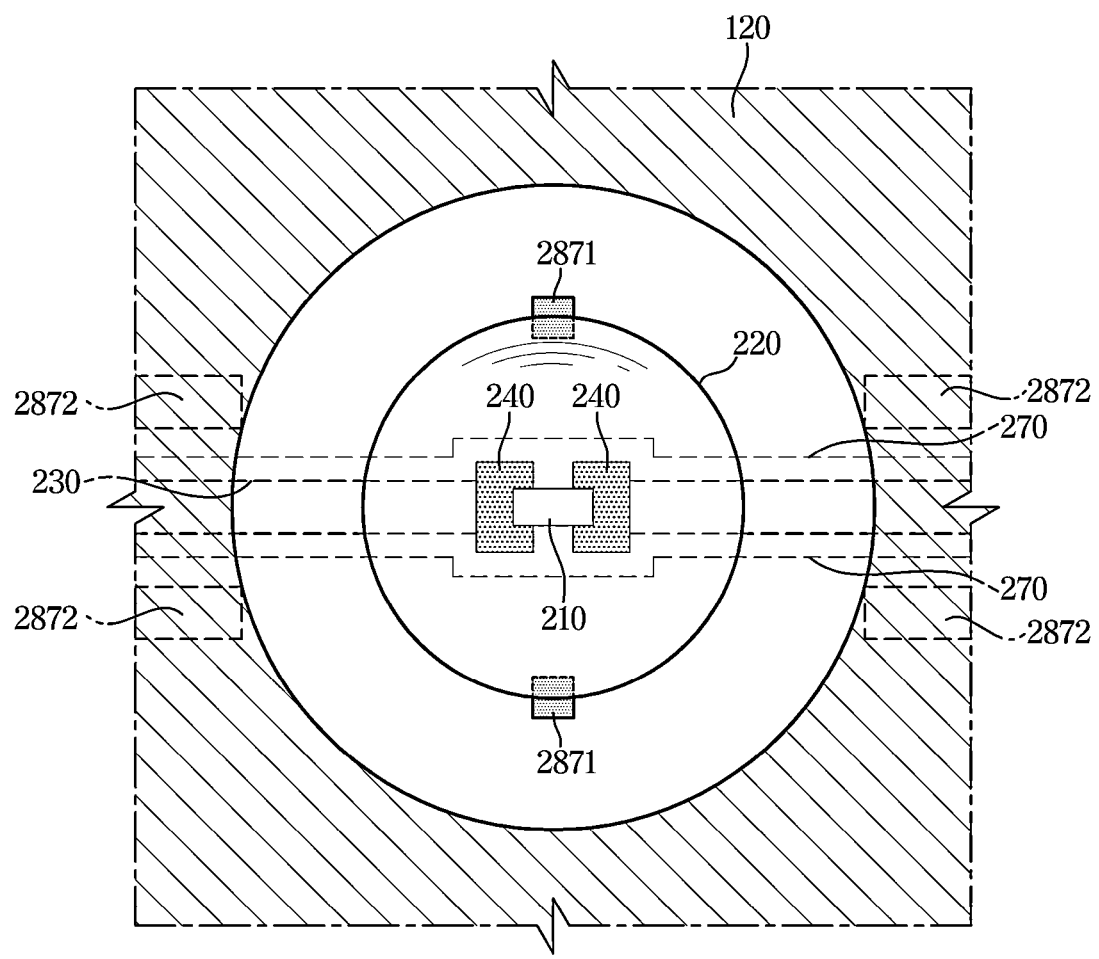
FIG. 19 illustrates a light source including a first antistatic pad in which a portion thereof overlaps with an optical dome, according to some embodiments.
Figure 20:
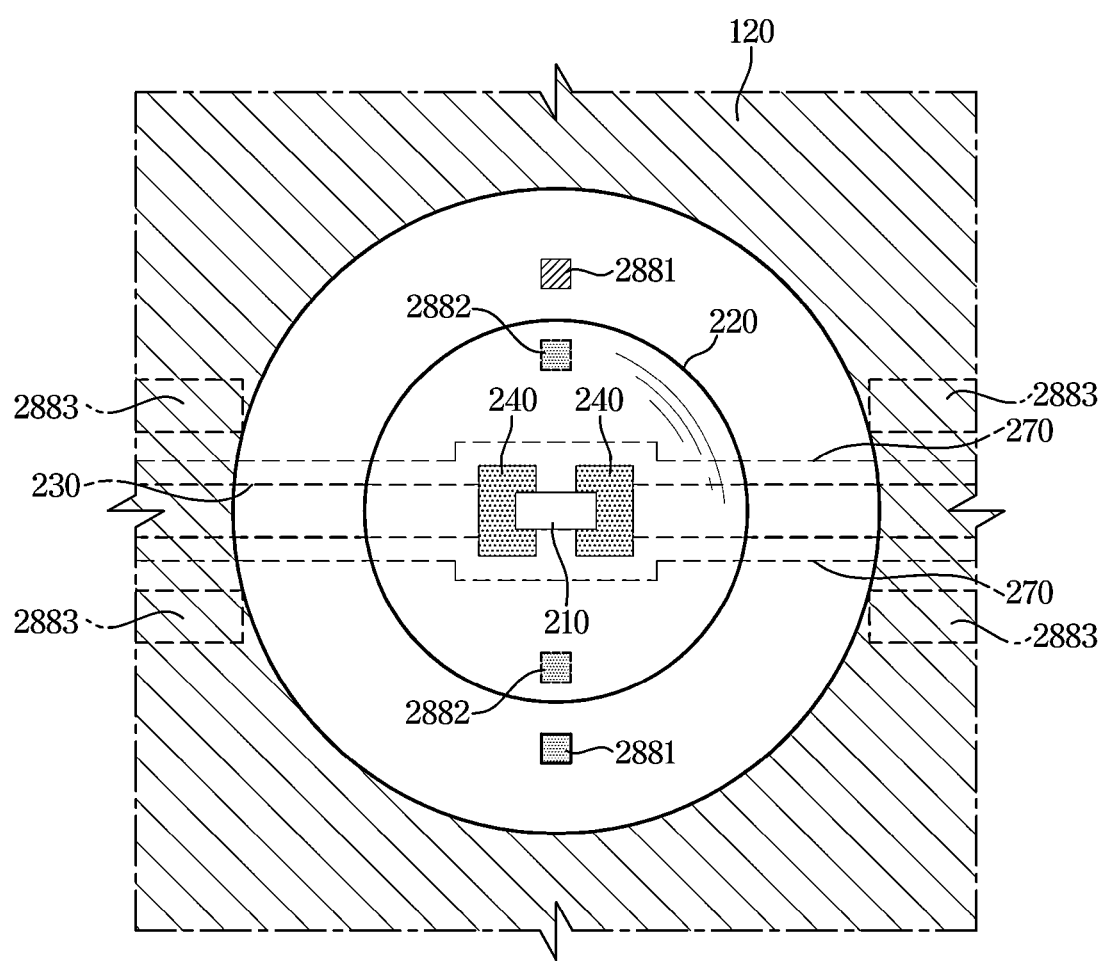
FIG. 20 illustrates a light source including a first antistatic pad overlapping with an optical dome and a first antistatic pad not overlapping with the optical dome, according to some embodiments.
Figure 21:
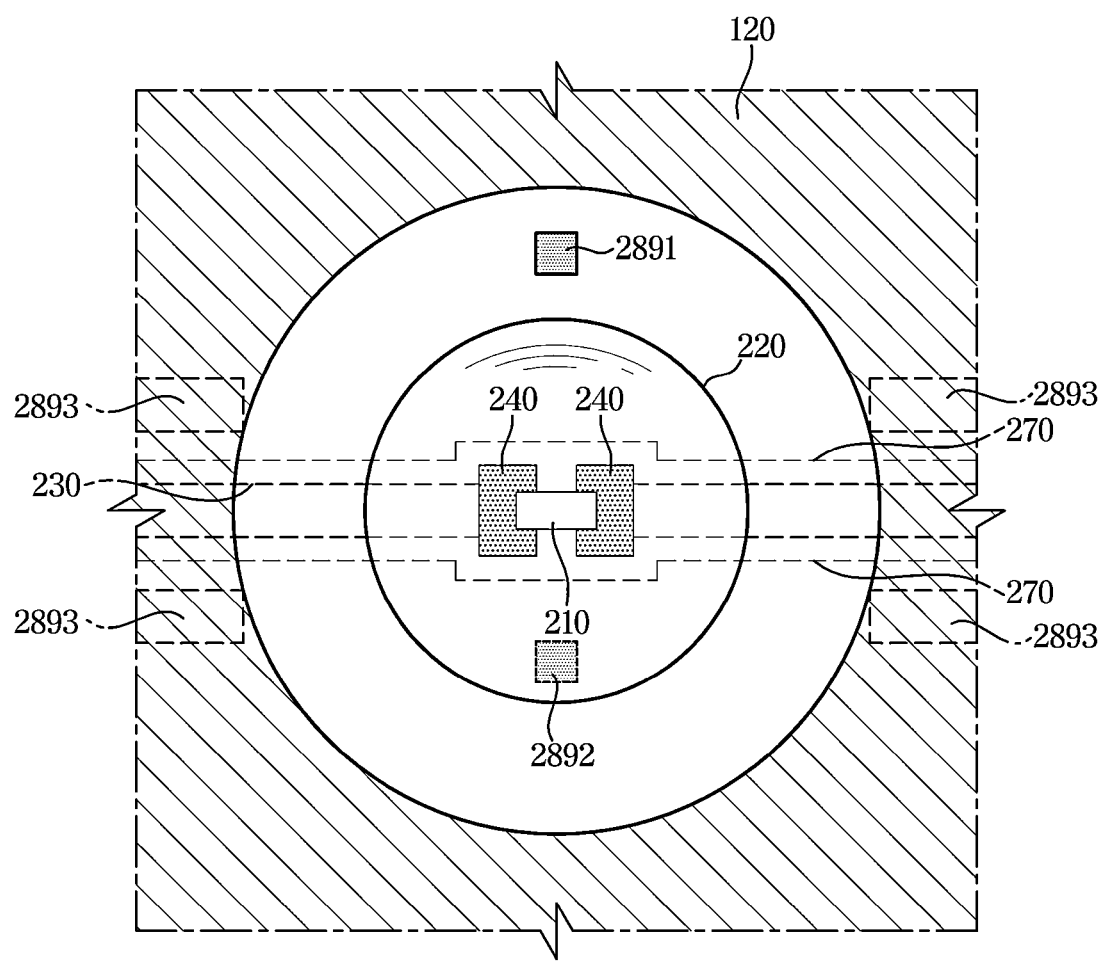
FIG. 21 illustrates a light source including a first antistatic pad overlapping with an optical dome and a first antistatic pad not overlapping with the optical dome, according to some embodiments.
Figure 22:
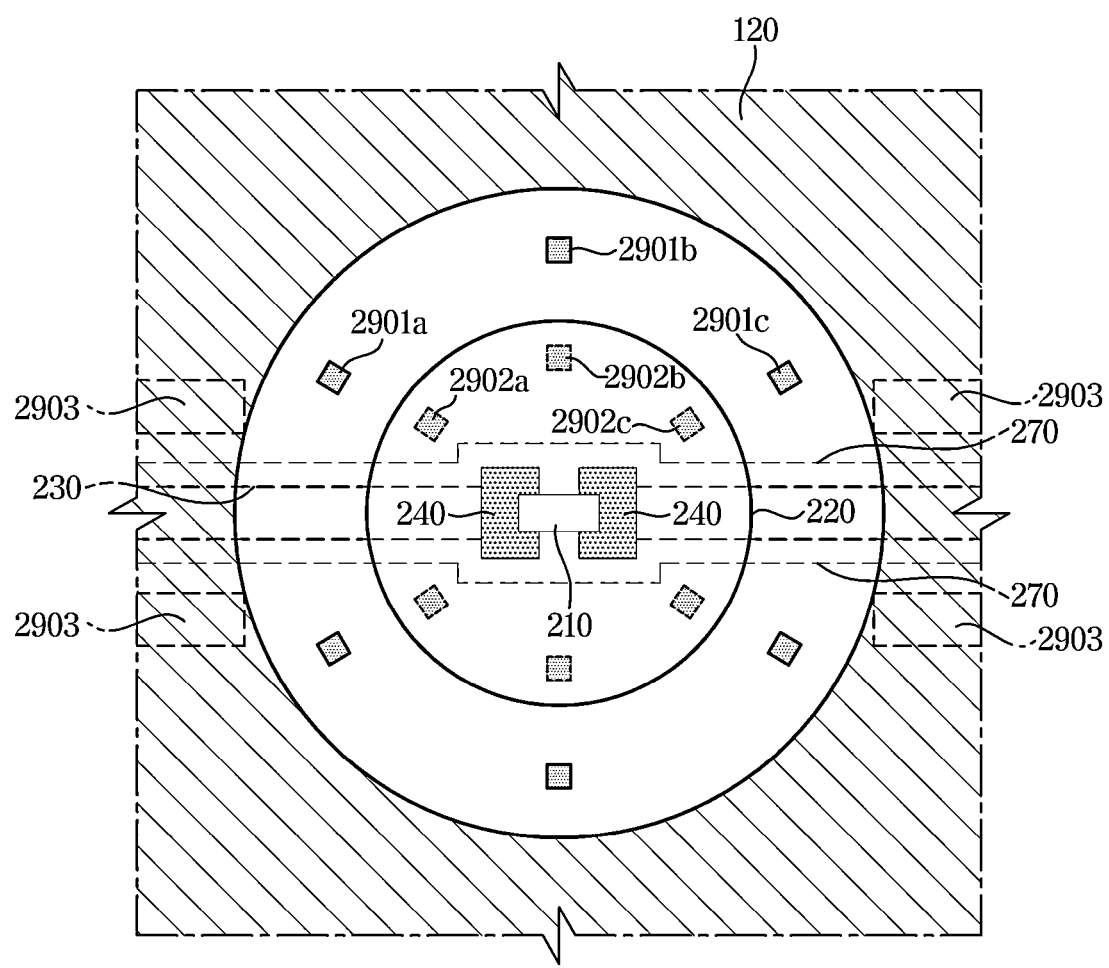
FIG. 22 illustrates a light source including three or more first antistatic pads overlapping with an optical dome and three or more first antistatic pads not overlapping with an optical dome, according to some embodiments.
Figure 23:
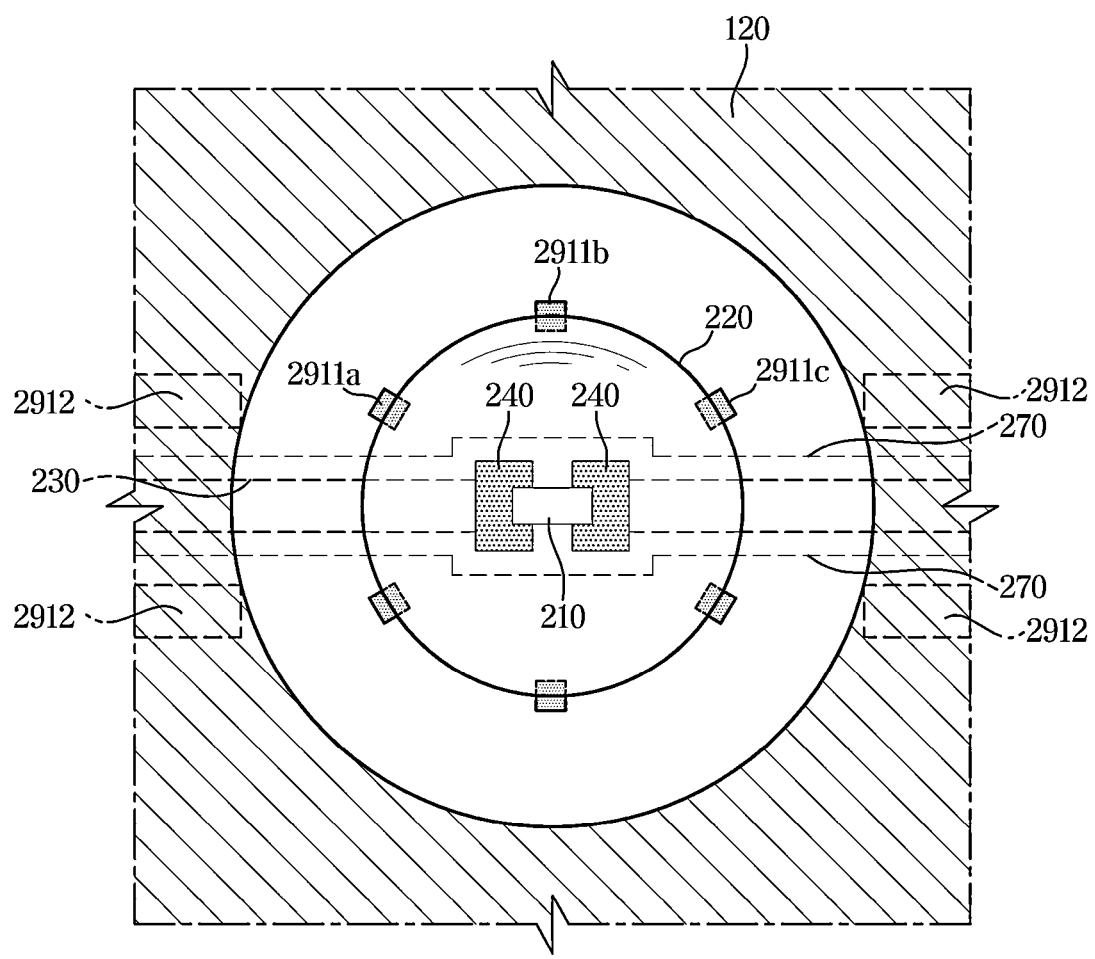
FIG. 23 illustrates a light source including three or more first antistatic pads in which a portion thereof overlaps with an optical dome, according to some embodiments.

FIG. 19 illustrates a light source including a first antistatic pad in which a portion thereof overlaps with an optical dome, according to some embodiments. FIG. 20 illustrates a light source including a first antistatic pad overlapping with an optical dome and a first antistatic pad not overlapping the optical dome, according to some embodiments. FIG. 21 illustrates a light source including a first antistatic pad overlapping with an optical dome and a first antistatic pad not overlapping with the optical dome, according to some embodiments. FIG. 22 illustrates a light source including three or more first antistatic pads overlapping with an optical dome and three or more first antistatic pads not overlapping with an optical dome, according to some embodiments. FIG. 23 illustrates a light source including three or more first antistatic pads partially overlapping with an optical dome, according to some embodiments.

FIGS. 6 and 10 illustrate the first antistatic pad 2801 that does not overlap with the optical dome 220, but the relative arrangement between the optical dome 220 and the antistatic pad 280 is not limited to the arrangement shown in FIGS. 6 and 10.

For example, as illustrated in FIG. 19, the antistatic member 260 may include a first antistatic pad 2871 in which a portion thereof overlaps with the optical dome 220. A structure (side cross-section) of the first antistatic pad 2871 may be the same as the first antistatic pad 2801 shown in FIGS. 6 and 10. Further, a structure and shape of a second antistatic pad 2872 may also be provided in the same as the above-mentioned second antistatic pad 2802.

The first antistatic pad 2871 in which a portion thereof overlaps with the optical dome 220 may be disposed at a portion where the outer surface of the optical dome 220 intersects the substrate 112. As mentioned above, charges due to electrostatic discharge may move to the boundary with the substrate 112 along the outer surface of the optical dome 220. Because the first antistatic pad 2871 is disposed at the boundary between the outer surface of the optical dome 220 and the substrate 112, charges moving along the outer surface of the optical dome 220 may move to the first antistatic pad 2871. Accordingly, a probability that charges moving along the outer surface of the optical dome 220 are collected by the antistatic member 260 may further increase. Additionally, the antistatic performance of the antistatic member 260 may be improved and the electrostatic discharge tolerance of the light source 111 may be improved.

In addition, as illustrated in FIG. 20, the antistatic member 260 may include a first outer antistatic pad 2881 disposed outside the outer surface of the optical dome 220, and a first inner antistatic pad 2882 disposed inside the outer surface of the optical dome 220. A structure (side cross-section) and shape of the first outer antistatic pad 2881 and the first inner antistatic pad 2882 may be the same as the first antistatic pad 2801 shown in FIGS. 6 and 10. Further, a structure and shape of a second antistatic pad 2883 may also be provided in the same as the above-mentioned second antistatic pad 2802.

As mentioned above, the first outer antistatic pad 2881 may collect charges moving to the outside of the outer surface of the optical dome 220. Further, the first inner antistatic pad 2882 may collect charges moving to the inside of the outer surface of the optical dome 220 along the boundary between the optical dome 220 and the substrate 112.

Accordingly, the antistatic member 260 including the antistatic pads 2881 and 2882 disposed on the outside and inside of the outer surface of the optical dome 220 may collect most of the charges caused by electrostatic discharge. Therefore, the antistatic performance of the antistatic member 260 may be improved and the electrostatic discharge tolerance of the light source 111 may be improved.

As illustrated in FIG. 21, the antistatic member 260 may include a first outer antistatic pad 2891 disposed outside the outer surface of the optical dome 220, and a first inner antistatic pad 2892 disposed inside the outer surface of the optical dome 220. A structure (side cross-section) and shape of the first outer antistatic pad 2891 and the first inner antistatic pad 2892 may be the same as the antistatic pads 281 and 282 shown in FIGS. 6 and 10. Further, a structure and shape of a second antistatic pad 2893 may also be provided in the same as the above-described second antistatic pad 2802.

By minimizing the number of antistatic pads 280, it is possible to prevent optical interference caused by the intrinsic color of the antistatic pad 280. Accordingly, it is possible to reduce distortion of the color of light emitted from the light source device 100.

As illustrated in FIG. 22, the antistatic member 260 may include three or more first outer antistatic pads 2901a, 2901b, and 2901c disposed outside one light source 111 and three or more first inner antistatic pads 2902a, 2902b, and 2902c disposed inside the light source 111. A structure and shape of each of the three or more first outer antistatic pads 2901a, 2901b, and 2901c and the three or more first inner antistatic pads 2902a, 2902b, and 2902c may be the same as the above-mentioned first antistatic pad 2801. Further, a structure and shape of a second antistatic pad 2903 may also be provided in the same as the above-mentioned second antistatic pad 2802.

The three or more first outer antistatic pads 2901a, 2901b, and 2901c may be arranged to surround the optical dome 220. The three or more first inner antistatic pads 2902a, 2902b, and 2902c may be arranged to surround the light emitting diode 210 and the feeding pad 240. The arrangement of the three or more first outer antistatic pads 2901a, 2901b, and 2901c may be the same as the arrangement of the three or more first antistatic pads 2841a, 2841b, and 2841c shown in FIG. 16.

The three or more first inner antistatic pads 2902a, 2902b, and 2902c may be disposed on the circumference of the virtual circle surrounding the light emitting diode 210 and the feeding pad 240, and may be maximally spaced apart from each other on the circumference of the virtual circle.

For example, the three or more first inner antistatic pads 2902a, 2902b, and 2902c may be arranged at approximately equal intervals along the circumference of the virtual circle surrounding the light emitting diode 210 and the feeding pad 240. As illustrated in FIG. 22, six antistatic pads may be arranged at angular intervals of approximately 60 degrees along the circumference of the virtual circle surrounding the light emitting diode 210 and the feeding pad 240.

As the three or more first inner antistatic pads 2902a, 2902b, and 2902c are disposed inside the optical dome 220, the antistatic member 260 may collect electric charges caused by electrostatic discharge penetrating into the inside of the optical dome 220 from approximately all directions. Accordingly, the ratio of electrostatic discharge charges collected by the antistatic member 260 may further increase, and the electrostatic discharge tolerance of the light source 111 may be further improved.

As illustrated in FIG. 23, the antistatic member 260 may include three or more first antistatic pads 2911a, 2911b, and 2911c in which a portion thereof overlaps with the optical dome 220. A structure and shape of each of the three or more first antistatic pads 2911a, 2911b, and 2911c may be the same as the above-mentioned first antistatic pad 2801.

The three or more first antistatic pads 2911a, 2911b, and 2911c may be disposed on a circumference of a virtual circle representing an outermost edge of the optical dome 220, and may be maximally spaced from each other on the circumference of the virtual circle. For example, the three or more first antistatic pads 2911a, 2911b, and 2911c may be arranged at approximately equal intervals along the outermost edge of the optical dome 220.

By providing the three or more first antistatic pads 2911a, 2911b, and 2911c in which a portion thereof overlaps with the optical dome 220, the antistatic member 260 may collect electric charges caused by electrostatic discharge penetrating into the inside of the optical dome 220 from approximately all directions. Accordingly, the ratio of electrostatic discharge charges collected by the antistatic member 260 may further increase, and the electrostatic discharge tolerance of the light source 111 may be further improved.

As mentioned above, the antistatic pads for protecting the light emitting diode 210 from electrostatic discharge may be formed in various numbers, shapes, and arrangements as needed.

In addition, the structure (side cross-section) of the antistatic pad is not limited to that shown in FIG. 9, and the antistatic pad may be formed in various structures.

Figure 24:
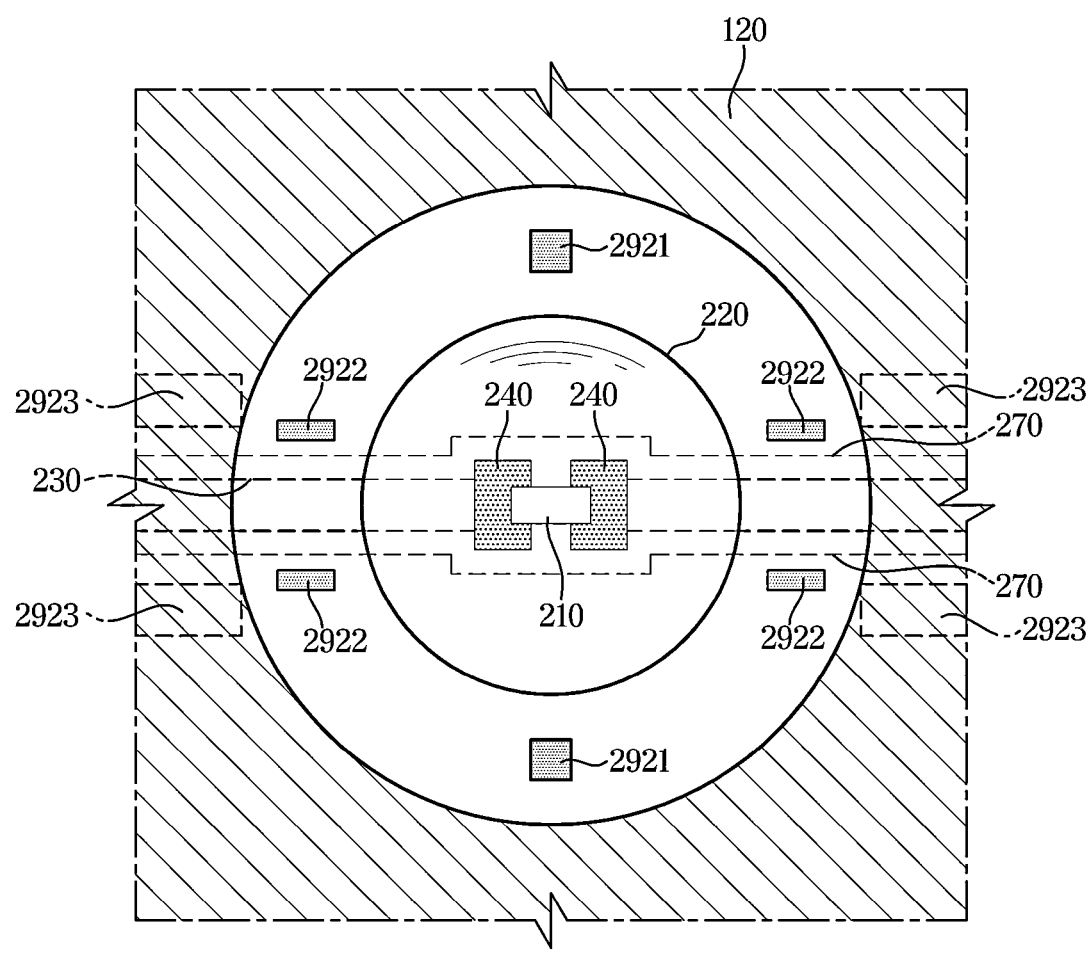
FIG. 24 illustrates a light source including a first antistatic pad provided to protect a feeding line, according to some embodiments.

FIG. 24 illustrates a light source including a first antistatic pad provided to protect a feeding line, according to some embodiments.

As illustrated in FIG. 24, the antistatic member 260 may include a first antistatic pad 2921 disposed near the optical dome 220 and a second antistatic pad 2922 and a third antistatic pad 2923 disposed near the feeding line 230. A structure (side cross-section) and shape of the first antistatic pad 2921 may be the same as the first antistatic pad 2801 shown in FIGS. 6 and 10. Further, a structure and shape of the third antistatic pad 2923 may be the same as the above-mentioned second antistatic pad 2802.

The first antistatic pad 2921 may collect charges moving to the outside of the outer surface of the optical dome 220.

The protection layer 253 may be generally formed of an insulator and may protect the feeding circuit, such as the feeding line 230, from electrostatic discharge. However, because the protection layer 253 is thinner than the optical dome 220, a voltage level that protects the feeding circuit such as the feeding line 230 from electrostatic discharge may be lower than that of the optical dome 220. As a result, the electric charges may penetrate into the feeding line 230 due to electrostatic discharge occurring near the feeding line 230 and the electric charges may damage the light emitting diode 210 through the feeding line 230.

In order to prevent or suppress the penetration of electric charges through the feeding line 230, the second antistatic pad 2922 may be provided near the feeding line 230. As illustrated in FIG. 24, the second antistatic pad 2922 may be disposed along the feeding line 230 on both sides of the feeding line 230.

By the second antistatic pad 2922, it is possible to prevent or suppress damage to the light emitting diode 210 due to electrostatic discharge generated near the feeding line 230 within the through-hole 120a of the reflective sheet 120.

Although certain example embodiments are illustrated and described above, the present disclosure is not limited to the example embodiments, various applications may of course be performed by those skilled in the art without deviating from what is claimed in the scope of claims, and such applications should not be understood separately from the technical idea or prospects herein.

What is claimed is:
1. A light source device comprising:
a reflective sheet comprising a hole formed therein; and
a light source module comprising:
a portion inserted into the hole;
a substrate comprising:
a first layer comprising a feeding line; and
a second layer laminated in an upper portion of the first layer;
a light-emitting diode on the second layer;
a feeding pad, connected to the feeding line, in a window formed in the second layer and configured to contact the light-emitting diode;
an insulating dome on the second layer and configured to cover the light-emitting diode; and
an antistatic pad on the second layer and comprising:
a silver plating layer;
a first antistatic inside the hole; and
a second antistatic pad outside of the hole and extending in a longitudinal direction of the feeding line spaced apart by a first length in a width direction of the feeding line.
2. The light source device of claim 1, wherein a width of the second antistatic pad is equal to a width of the feeding line.
3. The light source device of claim 1, wherein the second antistatic pad is covered by the reflective sheet.
4. The light source device of claim 1, wherein the insulating dome and the hole are provided in a plurality respectively corresponding to each other, and
wherein the second antistatic pad is provided in a plurality on both lateral sides of the feeding line between the plurality of holes.
5. The light source device of claim 1, wherein the first length is greater than or equal to 0.4 mm and less than or equal to 0.6 mm.
6. The light source device of claim 5, wherein a width of the feeding line is equal to the first length.
7. The light source device of claim 1, wherein the first layer comprises a conductive antistatic line, and
wherein the silver plating layer of the antistatic pad is applied to the conductive antistatic line exposed to an outside through the window formed in the second layer.

8. The light source device of claim 7, wherein the conductive antistatic line is electrically connected to a ground of the light source device or coupled to the ground by capacitance.

9. The light source device of claim 1, wherein the second antistatic pad extends along the longitudinal direction of the feeding line to a boundary line of a region defined by the hole.

10. The light source device of claim 1, wherein an upper surface of the feeding pad is plated with silver (Ag).

11. The light source device of claim 1, wherein the first antistatic pad is spaced apart from the light-emitting diode.

12. The light source device of claim 1, wherein at least one first antistatic pad is provided and disposed outside of the insulating dome.

13. The light source device of claim 1, wherein at least one first antistatic pad is provided and a portion of the at least one first antistatic pad overlaps with the insulating dome.

14. The light source device of claim 1, wherein the light-emitting diode directly contacts with the feeding pad without a wire or ball grid.

15. The light source device of claim 1, wherein the light-emitting diode directly contacts with the feeding pad without a Zener diode connected in parallel with the light-emitting diode.

* * * * *